(12) United States Patent
Strong et al.

(10) Patent No.: US 11,068,043 B2
(45) Date of Patent: Jul. 20, 2021

(54) SYSTEMS AND METHODS FOR VIRTUAL REALITY-BASED GROUPING EVALUATION

(71) Applicant: Pearson Education, Inc., New York, NY (US)

(72) Inventors: David Strong, Denver, CO (US); Scott Hellman, Dallas, TX (US); Johann Larusson, Phoenix, AZ (US); Jake Noble, Denver, CO (US); Timothy J. Stewart, Aurora, CO (US); Alex Nickel, New York, NY (US); Luis Oros, Denver, CO (US); Quinn Lathrop, Denver, CO (US); Daniel Tonks, St Neots (GB); Peter Foltz, Boulder, CO (US)

(73) Assignee: PEARSON EDUCATION, INC., New York, NY (US)

( * ) Notice: Subject to any disclaimer, the term of this patent is extended or adjusted under 35 U.S.C. 154(b) by 399 days.

(21) Appl. No.: 16/024,561

(22) Filed: Jun. 29, 2018

(65) Prior Publication Data
US 2019/0026357 A1    Jan. 24, 2019

Related U.S. Application Data

(60) Provisional application No. 62/535,695, filed on Jul. 21, 2017.

(51) Int. Cl.
*G06F 3/01* (2006.01)
*G06F 16/955* (2019.01)
(Continued)

(52) U.S. Cl.
CPC .............. *G06F 3/011* (2013.01); *G06F 3/013* (2013.01); *G06F 3/0346* (2013.01); *G06F 9/451* (2018.02);
(Continued)

(58) Field of Classification Search
CPC .... G06F 16/9535; G06F 3/013; G06F 3/0488; G06F 16/00; G06F 16/358; G06F 3/01; G06F 9/451
See application file for complete search history.

(56) References Cited

U.S. PATENT DOCUMENTS

| 5,035,625 A | 7/1991 | Munson et al. |
| 5,870,755 A | 2/1999 | Stevens et al. |
| (Continued) | | |

FOREIGN PATENT DOCUMENTS

EP    2696315 A1    2/2014

*Primary Examiner* — Irete F Ehichioya
*Assistant Examiner* — Ken Hoang
(74) *Attorney, Agent, or Firm* — Quarles & Brady LLP

(57) ABSTRACT

Systems and methods for virtual reality interaction evaluation are disclosed herein. The system can include a memory including: an interaction sub-database containing information relating to user interactions with at least one virtual asset in a virtual environment, and a content library database containing a plurality of virtual assets and information relating to those virtual assets. The system can include at least one server that can determine user engagement with at least one of the plurality of virtual assets, receive data indicative of an interaction with at least one of the plurality of virtual assets, and determine an interaction type of the interaction associated with the received data. The server can perform a speech capture and analysis process, perform a manipulation process, generate an evaluation of the user interactions with the at least one of the plurality of virtual assets, and deliver the generated evaluation.

6 Claims, 15 Drawing Sheets

(51) Int. Cl.
  *G06F 3/0346* (2013.01)
  *G06F 9/451* (2018.01)
  *G06F 16/28* (2019.01)
  *G06N 5/02* (2006.01)
  *G06N 20/00* (2019.01)
  *G10L 15/18* (2013.01)
  *G10L 15/22* (2006.01)
  *G10L 15/30* (2013.01)

(52) U.S. Cl.
  CPC .......... *G06F 16/287* (2019.01); *G06F 16/955* (2019.01); *G06N 5/02* (2013.01); *G06N 20/00* (2019.01); *G10L 15/1815* (2013.01); *G10L 15/22* (2013.01); *G10L 15/30* (2013.01); *G10L 2015/223* (2013.01)

(56) References Cited

U.S. PATENT DOCUMENTS

| | | |
|---|---|---|
| 6,134,539 A | 10/2000 | O'Conor et al. |
| 6,766,320 B1 | 7/2004 | Wang et al. |
| 6,795,808 B1 | 9/2004 | Strubbe et al. |
| 8,612,936 B2 | 12/2013 | Fox et al. |
| 8,699,939 B2 | 4/2014 | German et al. |
| 8,777,626 B2 | 7/2014 | Levy et al. |
| 9,158,841 B2 | 10/2015 | Hu et al. |
| 9,256,896 B2 * | 2/2016 | Bolger ................. A63F 13/798 |
| 9,437,083 B2 * | 9/2016 | Burnside ................ G07F 17/32 |
| 9,652,715 B2 | 5/2017 | Bhagwat et al. |
| 9,792,826 B2 | 10/2017 | Ngiam et al. |
| 9,805,615 B2 | 10/2017 | Foley, Jr. |
| 9,953,646 B2 | 4/2018 | Sadkin et al. |
| 10,146,414 B2 | 12/2018 | Heater |
| 10,360,265 B1 | 7/2019 | Agarwal |
| 10,388,272 B1 | 8/2019 | Thomson et al. |
| 2002/0138590 A1 | 9/2002 | Beams et al. |
| 2005/0245302 A1 | 11/2005 | Bathiche et al. |
| 2006/0178968 A1 | 8/2006 | June et al. |
| 2007/0112624 A1 | 5/2007 | Jung et al. |
| 2007/0134644 A1 | 6/2007 | Jones et al. |
| 2007/0233839 A1 | 10/2007 | Gaos |
| 2008/0120558 A1 | 5/2008 | Nathan et al. |
| 2008/0221892 A1 | 9/2008 | Nathan et al. |
| 2010/0325004 A1 | 12/2010 | Schoettle |
| 2011/0225494 A1 | 9/2011 | Shmuylovich et al. |
| 2012/0164621 A1 | 6/2012 | Katz et al. |
| 2012/0329027 A1 | 12/2012 | Lewolt |
| 2013/0029308 A1 | 1/2013 | Graesser et al. |
| 2013/0051547 A1 | 2/2013 | Chavez |
| 2013/0226674 A1 | 8/2013 | Field et al. |
| 2013/0304479 A1 | 11/2013 | Teller et al. |
| 2014/0108908 A1 | 4/2014 | Neff et al. |
| 2014/0168348 A1 * | 6/2014 | Kubota .................. H04N 7/148 348/14.02 |
| 2014/0278403 A1 | 9/2014 | Jacob et al. |
| 2014/0308650 A1 | 10/2014 | Loring et al. |
| 2014/0315169 A1 | 10/2014 | Bohbot |
| 2015/0039292 A1 | 2/2015 | Suleman et al. |
| 2015/0065241 A1 * | 3/2015 | McCarthy .......... G07F 17/3272 463/31 |
| 2015/0072322 A1 | 3/2015 | Williams et al. |
| 2015/0073907 A1 | 3/2015 | Purves et al. |
| 2015/0074819 A1 | 3/2015 | Borenstein |
| 2015/0081277 A1 | 3/2015 | Behi |
| 2015/0094144 A1 | 4/2015 | Brown et al. |
| 2015/0235561 A1 | 8/2015 | Lynch |
| 2015/0235564 A1 | 8/2015 | Lynch |
| 2015/0278820 A1 | 10/2015 | Meadows |
| 2015/0302652 A1 | 10/2015 | Miller et al. |
| 2015/0348433 A1 | 12/2015 | Gatterbauer et al. |
| 2016/0071302 A1 | 3/2016 | Meadows |
| 2016/0098936 A1 | 4/2016 | Solomon |
| 2016/0162466 A1 | 6/2016 | Munro et al. |
| 2016/0180731 A1 | 6/2016 | Allon et al. |
| 2016/0320838 A1 | 11/2016 | Teller et al. |
| 2016/0358495 A1 | 12/2016 | Bushell |
| 2016/0360336 A1 | 12/2016 | Gross et al. |
| 2016/0378861 A1 | 12/2016 | Eledath et al. |
| 2017/0060994 A1 | 3/2017 | Byron et al. |
| 2017/0084084 A1 | 3/2017 | Durham et al. |
| 2017/0206797 A1 | 7/2017 | Solomon et al. |
| 2017/0262045 A1 | 9/2017 | Rouvinez et al. |
| 2017/0337838 A1 | 11/2017 | Elkon |
| 2017/0352361 A1 | 12/2017 | Thorn |
| 2018/0059775 A1 | 3/2018 | Shafer et al. |
| 2018/0107902 A1 | 4/2018 | Yang et al. |
| 2018/0167290 A1 | 6/2018 | Hasegawa et al. |
| 2018/0181197 A1 | 6/2018 | Teller et al. |
| 2018/0196796 A1 | 7/2018 | Wu |
| 2018/0204569 A1 | 7/2018 | Nadkar et al. |
| 2018/0218734 A1 | 8/2018 | Somech et al. |
| 2018/0276895 A1 | 9/2018 | Hodge |
| 2018/0285682 A1 | 10/2018 | Najibi et al. |
| 2019/0026357 A1 | 1/2019 | Strong et al. |
| 2019/0027141 A1 | 1/2019 | Strong et al. |
| 2019/0206134 A1 | 7/2019 | Devam et al. |
| 2019/0272269 A1 | 9/2019 | Suleman et al. |

* cited by examiner

SYSTEMS AND METHODS FOR VIRTUAL REALITY-BASED GROUPING EVALUATION

CROSS-REFERENCE TO RELATED APPLICATIONS

This application claims the benefit of U.S. Provisional Application No. 62/535,695, filed on Jul. 21, 2017, and entitled "SYSTEM AND METHOD FOR REALITY-BASED ASSESSMENT", the entirety of which is hereby incorporated by reference herein.

BACKGROUND

A computer network or data network is a telecommunications network that allows computers to exchange data. In computer networks, networked computing devices exchange data with each other along network links (data connections). The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology, and organizational intent. In most cases, communications protocols are layered on (i.e. work using) other more specific or more general communications protocols, except for the physical layer that directly deals with the transmission media.

Notifications can be sent through a computer network. These notifications can be electronic notifications and can be received via e-mail, phone, text message, or fax. Notifications have many applications for businesses, governments, schools, and individuals.

BRIEF SUMMARY

One aspect of the present disclosure relates to a system for virtual reality based assessment. The system can include a memory including an interaction sub-database containing information relating to one or several user interactions with at least one virtual asset in a virtual environment, and a content library database containing a plurality of virtual assets and information relating to the plurality of virtual assets. The system include at least one server. The at least one server can: launch a user experience in a virtual environment; generate a plurality of assets within the virtual environment; record user actions in the virtual environment, which user actions can include at least one interaction with one or more of the assets; deliver at least one asset response to the user interactions with the one or more assets; and generate an evaluation of the user actions within the environment.

In some embodiments, the system can include a virtual reality headset or an augmented reality headset. In some embodiments, the user experience is launched within the virtual reality headset or the augmented reality headset. In some embodiments, the plurality of assets are generated within the virtual reality headset or the augmented reality headset.

In some embodiments, the at least one server can: receive user information, which user information identifies at least one attribute of the user; and customize the virtual environment based on the user information. In some embodiments, the user information identifies at least one of: a previously provided virtual asset; and a user skill level. In some embodiments, the user information identifies a configuration profile containing information relating to a preferred positioning of the assets within the virtual environment. In some embodiments, the configuration profile is specific to a user.

In some embodiments, the user actions in the virtual environment include: selectively viewing one of the one or more virtual assets and selectively posing at least one question to one of the one or more virtual assets. In some embodiments, the at least one processor can generate an evaluation of the user actions within the virtual environment. In some embodiments, generating the evaluation can include analyzing the at least one question. In some embodiments, the asset response is delivered in response to the at least one question posed to one of the one or more virtual assets. In some embodiments, recording user interactions includes: identifying a user gaze; determining object engagement; recording user speech; and analyzing user speech. In some embodiments, the identifying the user gaze includes: identifying a user location in the virtual environment; and identifying a direction of the user gaze.

One aspect of the present disclosure relates to a method of virtual reality based assessment. The method can include: launching a user experience in a virtual environment created by a computing device; generating a plurality of assets within the virtual environment; recording user actions in the virtual environment, which user actions include at least one interaction with one or more of the virtual assets; delivering at least one asset response to the at least one user interaction with the one or more virtual assets; and generating an evaluation of the user actions within the virtual environment.

In some embodiments, the user experience is launched within a virtual reality headset or an augmented reality headset. In some embodiments, the plurality of assets are generated within the virtual reality headset or the augmented reality headset.

In some embodiments, the method includes: receiving user information, which user information identifies at least one attribute of the user; and customizing the virtual environment based on the user information. In some embodiments, the user information identifies at least one of: a previously provided virtual asset; and a user skill level. In some embodiments, the user information identifies a configuration profile containing information relating to a preferred positioning of the assets within the virtual environment. In some embodiments, the configuration profile is specific to a user.

In some embodiments, the user actions in the virtual environment include: selectively viewing one of the one or more virtual assets; and selectively posing at least one question to one of the one or more virtual assets. In some embodiments, generating an evaluation of the user actions within the virtual environment includes analyzing the at least one question. In some embodiments, the asset response is delivered in response to the at least one question posed to one of the one or more virtual assets. In some embodiments, recording user interactions includes: identifying a user gaze; determining object engagement; recording user speech; and analyzing user speech. In some embodiments, the identifying the user gaze includes: identifying a user location in the virtual environment; and identifying a direction of the user gaze.

One aspect of the present disclosure relates to a system for virtual reality interaction evaluation. The system can include memory. The memory can include: an interaction sub-database containing information relating to one or several user interactions with at least one virtual asset in a virtual environment; and a content library database containing a plurality of virtual assets and information relating to the plurality of virtual assets. The system can include at least one server. The at least one server can: determine user engagement with at least one of the plurality of virtual assets; receive data indicative of an interaction with at least one of the plurality of virtual assets; determine an interaction type of the interaction associated with the received data, which interaction type includes at least one of: a verbal interaction; and a manipulation interaction; perform a speech capture and analysis process when a verbal interaction identified; perform a manipulation process when a manipulation interaction is received; generate an evaluation of the user interactions with the at least one of the plurality of virtual assets; and deliver the generated evaluation.

In some embodiments, the at least one server can detect a user gaze, and in some embodiments, user engagement is determined based on the detected user gaze. In some embodiments, the speech capture and analysis process can include recording at least one question from the user. In some embodiments, the speech capture and analysis process includes: generating a speech file of the at least one question; converting the speech file to text via a speech recognition algorithm; extracting at least one key word from the question; inputting the at least one key word into a machine learning speech algorithm, which machine learning speech algorithm can predict response content for a question from inputted key words; and outputting a topic prediction from the machine learning speech algorithm.

In some embodiments, the speech capture and analysis process further includes selecting a machine learning speech algorithm. In some embodiments, the machine learning speech algorithm is specific to the at least one of the plurality of virtual assets for which the data indicative of the interaction was received.

In some embodiments, the at least one server can deliver at least one asset response to the user interaction with the at least one of the plurality of virtual assets. In some embodiments, delivering the at least one asset response to the user interactions with the plurality of virtual assets includes: identifying response data based on the output topic prediction; generating natural language text from the response data; generating a response file; and playing the response file to the user. In some embodiments, delivering at least one asset response to the user interactions with the plurality of virtual assets includes: receiving response feedback indicating whether the response answers the at least one questions; and updating the machine learning speech algorithm based on the received response feedback.

In some embodiments, the manipulation process includes: receiving a manipulation request; retrieving manipulation data; and generating a manipulated virtual asset from the retrieved manipulation data. In some embodiments, the manipulation process further includes providing the manipulated virtual asset to the user.

One aspect of the present disclosure relates to a method for virtual reality interaction evaluation. The method includes: determining user engagement with at least one of the plurality of virtual assets; receiving data indicative of an interaction with at least one of the plurality of virtual assets; determining an interaction type of the interaction associated with the received data, which interaction type includes at least one of: a verbal interaction; and a manipulation interaction; performing a speech capture and analysis process when a verbal interaction identified; performing a manipulation process when a manipulation interaction is received; generating an evaluation of the user interactions with the at least one of the plurality of virtual assets; and delivering the generated evaluation.

In some embodiments, the method includes detecting a user gaze, which user engagement is determined based on the detected user gaze. In some embodiments, the speech capture and analysis process includes: recording at least one question from the user; generating a speech file of the at least one question; converting the speech file to text via a speech recognition algorithm; extracting at least one key word from the question; inputting the at least one key word into a machine learning speech algorithm, which machine learning speech algorithm can predict response content for a question from inputted key words; and outputting a topic prediction from the machine learning speech algorithm.

In some embodiments, the speech capture and analysis process further includes selecting a machine learning speech algorithm. In some embodiments, the machine learning speech algorithm is specific to the at least one of the plurality of virtual assets for which the data indicative of the interaction was received.

In some embodiments, the method can include delivering at least one asset response to the user interaction with the at least one of the plurality of virtual assets. In some embodiments, delivering the at least one asset response to the user interactions with the plurality of virtual assets includes: identifying response data based on the output topic prediction; generating natural language text from the response data; generating a response file; and playing the response file to the user. In some embodiments, delivering at least one asset response to the user interactions with the plurality of virtual assets includes: receiving response feedback indicating whether the response answers the at least one questions; and updating the machine learning speech algorithm based on the received response feedback. In some embodiments, the manipulation process includes: receiving a manipulation request; retrieving manipulation data; generating a manipulated virtual asset from the retrieved manipulation data; and providing the manipulated virtual asset to the user.

One aspect of the present disclosure relates to a system for virtual reality interaction evaluation. The system includes a memory. The memory can include: an interaction sub-database containing information relating to one or several user interactions with at least one virtual asset in a virtual environment; and a content library database containing a plurality of virtual assets and information relating to the plurality of virtual assets. The system can include at least one server. The at least one server can: determine user engagement with at least one of the plurality of virtual assets; receive data indicative of a grouping interaction with at least one of the plurality of virtual assets, which data indicative of the grouping interaction identifies a group of virtual assets; perform a grouping process when a grouping interaction identified; generate an evaluation of the grouping interaction with the at least one of the plurality of virtual assets; and deliver the generated evaluation.

In some embodiments, the data indicative of the grouping interaction includes a user input grouping some of the plurality of virtual assets. In some embodiments, the user input includes moving the some of the plurality of virtual assets to a location within the virtual environment. In some embodiments, the location within the virtual environment can be a virtual table.

In some embodiments, performing the grouping process includes: identifying the group of virtual assets; inputting the group of virtual assets into a grouping prediction model; identifying a predicted grouping basis; identifying the predicted grouping basis as a grouping reason; and evaluating the grouping based on the grouping reason. In some embodiments, evaluating the grouping of some of the plurality of virtual assets includes: receive an input identifying the basis of the grouping; and identifying the identified grouping basis as the grouping reason. In some embodiments, evaluating the grouping based on the grouping reason includes: inputting the grouping reason into an evaluation model; and outputting a score indicative of a cognitive level of the grouping reason.

In some embodiments, the at least one server can further: determine interaction quality; receive the score indicative of the cognitive level of the grouping reason; and direct generation of a dashboard in a user device. In some embodiments, the dashboard includes a user interface including panels to display information relating to user actions in the virtual environment. In some embodiments, at least one of the panels is a grouping panel.

In some embodiments, the at least one server can generate a send signals containing information for display in the grouping panel. In some embodiments, the information for display in the grouping panel identifies one or several virtual assets included in a grouping. In some embodiments, the panels includes an evaluation panel. In some embodiments, the evaluation panel can display the score indicative of a cognitive level of the grouping reason for the grouped virtual assets.

One aspect of the present disclosure relates to a method for virtual reality interaction evaluation. The method includes: launching a user experience in a virtual environment created by a computing device; generating a plurality of assets within the virtual environment; determining with the computing device user engagement with at least one of the plurality of virtual assets; receiving data at the computing device, which data is indicative of a grouping interaction with at least one of the plurality of virtual assets, and which data indicative of the grouping interaction creates a group of virtual assets; performing with the computing device a grouping process based on the received data indicative of the grouping interaction with the at least one of the plurality of virtual assets; generating with the computing device an evaluation of the grouping interaction with the at least one of the plurality of virtual assets; and delivering the generated evaluation to a user device.

In some embodiments, the data indicative of the grouping interaction includes a user input grouping some of the plurality of virtual assets. In some embodiments, the user input includes moving the some of the plurality of virtual assets to a location within the virtual environment. In some embodiments, the location within the virtual environment can be a virtual table.

In some embodiments, performing the grouping process includes: identifying the group of virtual assets; inputting the group of virtual assets into a grouping prediction model; identifying a predicted grouping basis; identifying the predicted grouping basis as a grouping reason; and evaluating the grouping based on the grouping reason. In some embodiments, evaluating the grouping of some of the plurality of virtual assets includes: receive an input identifying the basis of the grouping; and identifying the identified grouping basis as the grouping reason. In some embodiments, evaluating the grouping based on the grouping reason includes: inputting the grouping reason into an evaluation model; and outputting a score indicative of a cognitive level of the grouping reason.

In some embodiments, the method includes: determining interaction quality; receiving the score indicative of the cognitive level of the grouping reason; and directing generation of a dashboard in the user device. In some embodiments, the dashboard includes a user interface including panels configured to display information relating to user actions in the virtual environment. In some embodiments, at least one of the panels includes a grouping panel. In some embodiments, the method includes generating and sending signals containing information for display in the grouping panel. In some embodiments, the information for display in the grouping panel identifies one or several virtual assets included in a grouping. In some embodiments, at least one of the panels can be an evaluation panel. In some embodiments, the evaluation panel can display the score indicative of a cognitive level of the grouping reason for the grouped virtual assets. In some embodiments, the interaction quality is determined based at least partially on omitted interactions.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
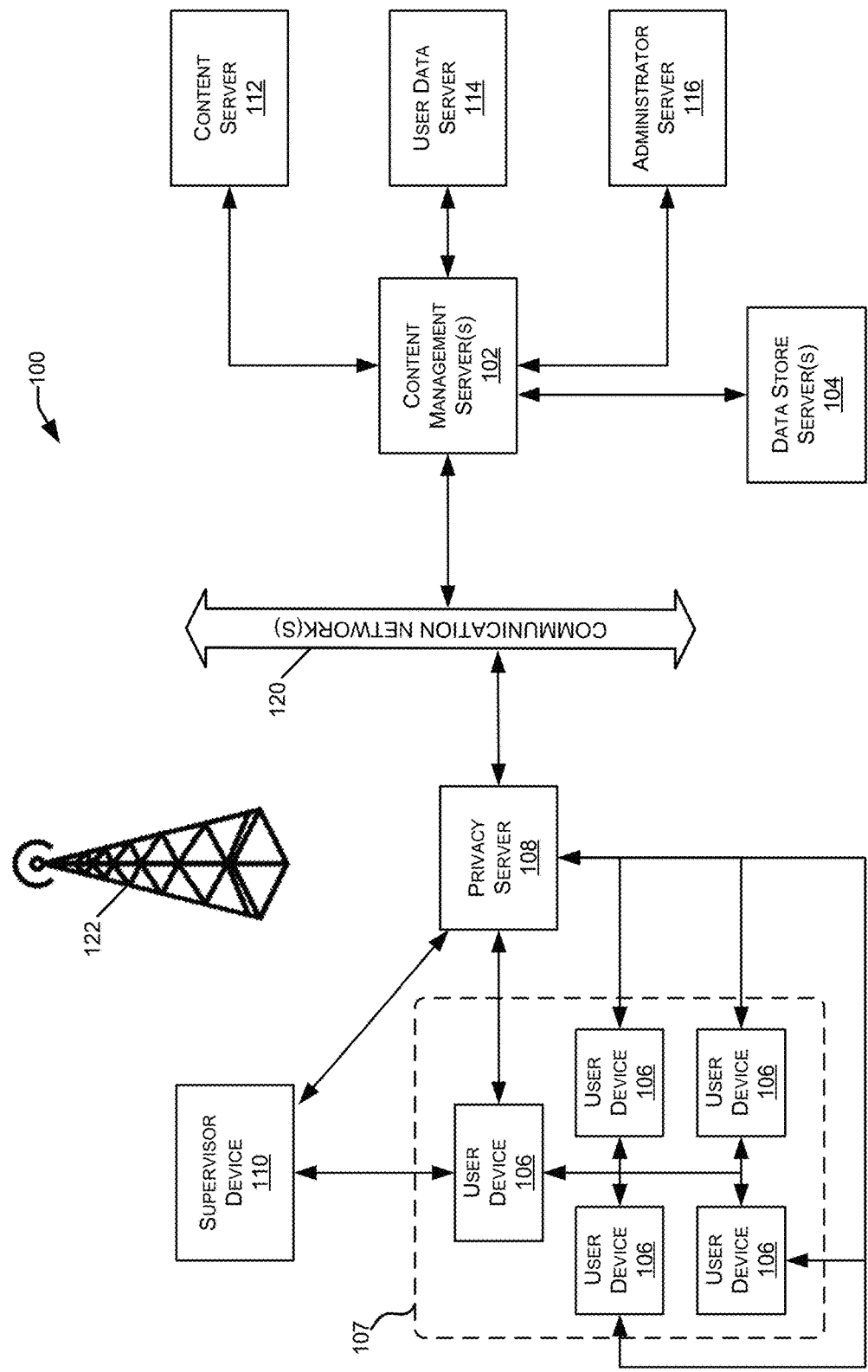
FIG. 1 is a block diagram illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, virtual reality devices such as, for example, virtual reality headsets, augmented reality devices such as, for example, augmented reality headset, and wearable computing devices. In some embodiments, the user device 106 can be any device that includes, for example, a camera, a speaker, a screen or display, and a microphone. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
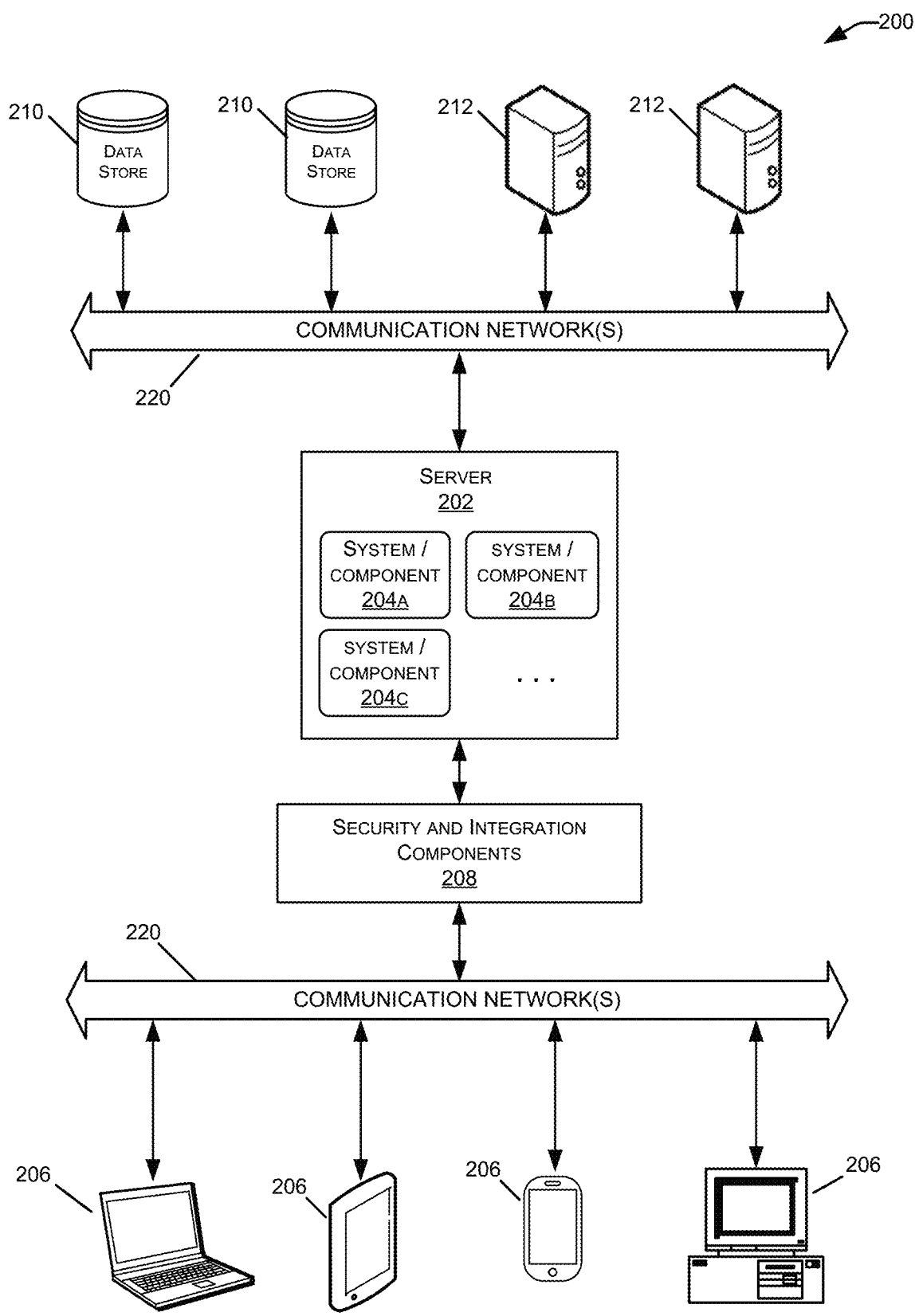
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure.

In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
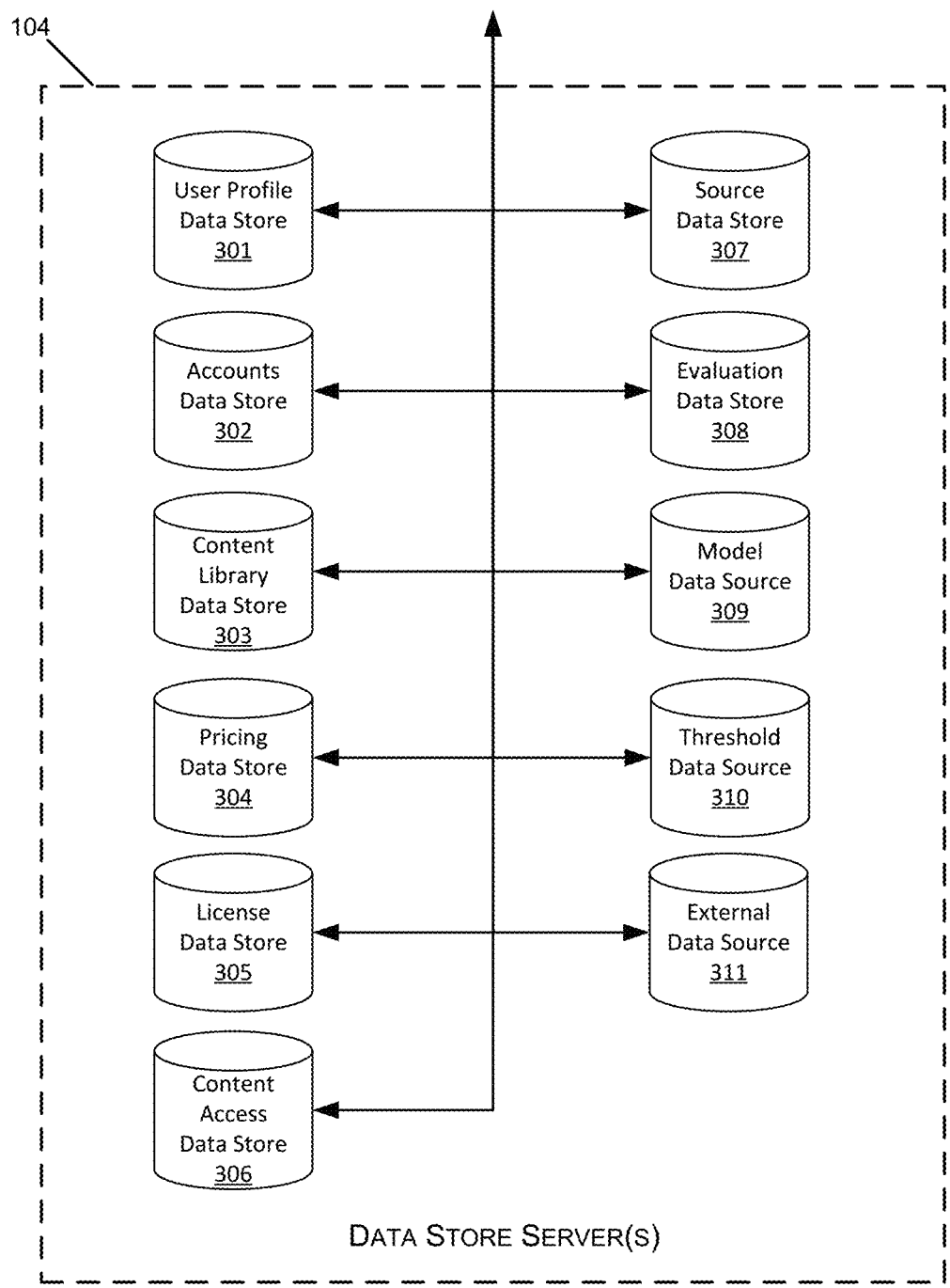
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information, also referred to herein as user metadata, relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, the user metadata can identify, for example, a user skill level, a user cognitive level, assets previously presented to the user, activities previously performed by the user, virtual environment preferences, or one or several physical attributes of the user. In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

In some embodiments, the user profile database 301 can include an interaction sub-database that can store information relating to one or several user interactions with the CDN 100, and specifically relating to one or several user interactions with a user experience created by the CDN 100 and more specifically with a virtual world containing virtual assets created by the CDN 100. In some embodiments, this interaction database can be further subdivided to contain a speech database, a manipulation database, and a grouping database. The speech database can contain information identifying verbal interactions between the user and the CDN 100. These can include, for example, one or several user comments, questions, responses or the like, and one or several questions, responses, comments, or the like posed or provided by the CDN 100. In some embodiments, the speech database can include information relating to the evaluation of speech or speech interactions.

The manipulation database can include information relating to one or several manipulations of assets within the virtual world by, for example, the user. In some embodiments, the user can interact with one or several assets such as, for example, to change the size of the asset either by enlarging or shrinking the asset, to open the asset, to see inside the asset, or the like.

The grouping database can include information relating to a user grouping of one or more of the assets. In some embodiments, for example, the user can group one or several of the assets into one or several groups. The grouping database can include information identifying assets in these one or several groupings, information related to the reason for the grouping and/or the predicted reason for the grouping, and/or information relating to an evaluation of the grouping.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library database 303 can include a plurality of content components. The content components can, in some embodiments, comprise one or several tasks, questions, activities, or the like that can be combined together to create a single piece of content, also referred to herein as a content aggregation or form, such as, for example, a single assignment, quiz, test, or evaluation. In some embodiments, these single content components can be each associated with information. This information can be generated from user interaction with the content of the single components. In some embodiments, this information can, for example, characterize a reliability of the single item, a difficulty of the single item, a differentiation of the single item, one or several averages of the single item, one or several standard deviations of the single item, or the like. In some embodiments, the differentiation of the single item can characterize the degree to which correctly or incorrectly responding to the item delineates between skill levels, attribute levels, or the like. In some embodiments, information associated with single items can be used to determine a reliability of a combination of multiple items.

In some embodiments, the content library database 303 can comprise one or several forms that can each include a plurality content components. In some embodiments, these forms can be created by a user of the CDN 100 from the content components stored in the content library database

303. In some embodiments, some or all of these one or several forms can be characterized by, for example, one or several scores or statistical measures. These scores or statistical measures can include a reliability coefficient such as, for example, a Cronbach's α, an error score or value such as, for example, a standard error of measurement (SEM) score, or the like. In some embodiments, one or several of these scores can be calculated based on the information associated with each of the content components. In some embodiments, these one or several scores of the form can be calculated in real-time and in some embodiments, one or several scores for alternative forms can be calculated to allow the recommendation of one or several content components for inclusion in the form and/or for removal from the form. In some embodiments, these one or several scores can vary based on one or several attributes of the intended recipient and/or recipients of the form. These one or several attributes can include, for example, gender, age, education, intelligence, or the like.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets that can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

In some embodiments, the content library database 303 can include sub databases containing content generated by one or several users including, for example, a content database and/or a comment database. In some embodiments, for example, content can be associated with a group of users such as a group of users in a course, a class, a training group, or the like, which users can include, one or several students, trainees, or the like. In some embodiments, this group of users can further include one or several teachers, trainers, professors, or the like. This content can be generated by one of the users or can be generated by a source other than one of the users. This content can, in some embodiments, comprise a plurality of pieces of content each of which pieces of content can be generated by one or several of the users. In some embodiments such as when the group of users is in a course, each of the pieces of content can be generated by one or several users as part of an assignment, a test, a quiz, or the like. The content can comprise the video file, and audio file, text file, and image file, or the like.

The comment database can comprise comments relating to one or several of the pieces of content in the content database. The comments can be generated by one or several of the users. The comment database can be, in some embodiments, independent of the content database such that a change to the comment database does not change the content database. Similarly, in some embodiments, the comment database is independent of the content database such that a change to the content database does not change the comment database. In such embodiments, the comment database can include one or several pointers associated with entries in the comment database linking those entries to pieces of content in the content database. The Scott comments stored in the comment database as entries can be linked to the appropriate one of the pieces of content in the content database via the one or several pointers. In some embodiments, each entry in the content database can include information identifying the one or several pieces of content associated with the entry, comment content, data identifying one or several evaluation criteria or evaluation metrics associated with the content, or the like.

The content library database 303 can comprise a plurality of assets, asset information associated with assets forming the plurality of assets, and asset manipulation data. In some embodiments, an asset can comprise virtual representation of anything including, for example, an object, an item, a person, an animal, a plant, an organism, an event, an artifact such as a historic artifact, or the like. In some embodiments, some or all of the assets can be grouped into one or several activities or exercises. The assets stored in the content library database 303 can comprise the computer code or instructions for generating the virtual asset within a user experience.

The asset information can identify one or several traits or attributes of the assets. These can include, for example, a name, a size, a color, a significance, a use, a location of creation, a cultural significance, an era of creation, composition, one or several significant achievements, or the like. In some embodiments, these one or several traits or attributes can be organized in a hierarchy from simplest to most complex trait or attribute. Thus, in some embodiments, a color, shape, name, or size can be examples of simple attributes, whereas, a cultural significance and one or several significant achievements can be examples of complex traits or attributes.

The asset manipulation data, also referred to herein as manipulation data, can identify possible manipulations of the asset. These can include, for example, enlarging the asset, viewing inside of the asset, opening the asset, or the like. In some embodiments, the content library database 303 can be comprise one or several sub-databases such as, for example, an asset sub-database, an asset information sub-database containing the asset information, and an asset manipulation sub-database containing the asset manipulation data.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In some embodiments, the evaluation database 308 can comprise a sub database identified herein as the evaluation metric database. In some embodiments, the evaluation metric database can identify one or several criteria, metrics, rubrics, or the like for use in evaluating one or several of the one or several pieces of content in the content database. In some embodiments, the one or several metrics can each define one or several metric subcomponents and provide information for generating one or several values characterizing each of those one or several metric subcomponents. In some embodiments, the evaluation metric database can be independent of one or both of the content database and the comment database. In some embodiments, some or all of the entries in the comment database can be linked to one or several of the metrics, rubrics, criteria, or the like in the evaluation metric database. In one embodiment, for example, each entry in the comment database can be linked to a metric in the evaluation metric database, and specifically each entry in the comment database can be linked to one or several of the metric subcomponents within one of the metrics in the evaluation database. In some embodiments, this link can identify one or several metric subcomponents relevant to the comment.

In some embodiments, each metric in the evaluation metric database can be associated with metric metadata. This metric metadata can identify information relevant to the metric such as, for example, the course or section associated with the metric, the teacher associated with the metric, the assignment associated with the metric, or the like. The metric metadata can be stored in the evaluation metric database and can be linked to its associated metric(s).

A model data store 309, also referred to herein as a model database 309, can store information relating to one or several predictive models. In some embodiments, the model database can comprise one or several models that can, upon input of one or several features and/or parameters from a response, generate an evaluation value for that response. In some embodiments, these can include one or several evaluation models, evidence models, risk models, skill models, or the like. In some embodiments, the model can be a mathematically-based statistical model. The model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example, in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example, a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

In some embodiments, the evaluation model can comprise a statistical model that can generate an evaluation value based on information relating to a received response. In some embodiments, this information can include one or several features identified in the received response, which one or several features can be used to generate one or several parameters. These parameters can be input into the evaluation model, which can be an Artificial Intelligence (AI) model that can include a machine learning model such as, for example, a Bayesian network, a support vector machine, a Random forest model, a decision tree model, a classifier, a regression-based model or the like.

In some embodiments, the model database 309 can comprise a correlation database, which correlation database can comprise a sub-database of the model database. The correlation database can include evaluation range data, which can divide one or several sets of potential evaluation values into one or several groups or ranges. In some embodiments, the correlation database can further include one or several elevated evaluation protocols and/or information pertaining to the same. In some embodiments, these one or several elevated evaluation protocols can identify one or several actions, steps, evaluators, models, or the like for implementation when an elevated evaluation is indicated.

In some embodiments, the model database 309 can comprise one or several sub-databases of training data. This training data can be used in training a model. In some embodiments, the training data can comprise, for example, a plurality of responses and an evaluation for each of the plurality of responses.

The model database 309 can include one or several machine learning models including, for example, a machine learning language model, a prediction model, and/or an evaluation model. The machine learning language model, also referred to herein as a speech model, can comprise a machine learning algorithm or classifier that is trained to receive an identifier of an asset and one or several keywords from one or several questions directed to that asset and to identify and/or predict appropriate response data to those one or several questions. In some embodiments, the speech model can comprise a plurality of speech models such that each asset is associated with its own speech model, or a single speech model can be applicable to a plurality of assets. In some embodiments, the speech model can be linked with the object database 303, and specifically with the asset attribute sub-database in the object database.

The model database 309 can include the prediction model. In some embodiments, the prediction model can predict a reason for a grouping of one or several assets. The prediction model, which can comprise a regression model, can, in some embodiments, predict the reason for a grouping of one or several assets based on the attributes and/or traits of those one or several assets and/or one or several attributes of the user forming the grouping. In some embodiments, for example, identification of assets in a grouping can be provided to the prediction model. The prediction model can then, based on, for example, attributes of the assets, identify a prediction of a reason for the grouping, which prediction can be associated with a value indicative of the probability of the predicted grouping reason being the actual grouping reason. In some embodiments, the prediction model can be influenced by one or several attributes of the user forming the grouping, such as, for example, past reasons for groupings created by that user, the cognitive level of reasons for grouping created by that user, or the like.

The model database 309 can include the evaluation model. In some embodiments, the evaluation model can evaluate the reason for the grouping of the one or several assets. Specifically, the evaluation model can evaluate one or both of the predicted reason for the grouping of the one or several assets, and the actual reason for the grouping of one or several assets. The evaluation model can comprise a machine learning algorithm or classifier that is trained to receive one or several keywords of the reason for grouping along with one or several attributes of the user creating the grouping and identify a cognitive level of the grouping. In some embodiments, this can include identifying a level within a taxonomy such as Bloom's taxonomy corresponding to the cognitive level or difficulty level associated with the reason for the grouping.

A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third party data sources accessible to the content management network 100, but not maintained by the content management network 100. External data aggregators 311 may include any electronic information source relating to the users, content resources, or applications of the content distribution network 100. For example, external data aggregators 311 may be third party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
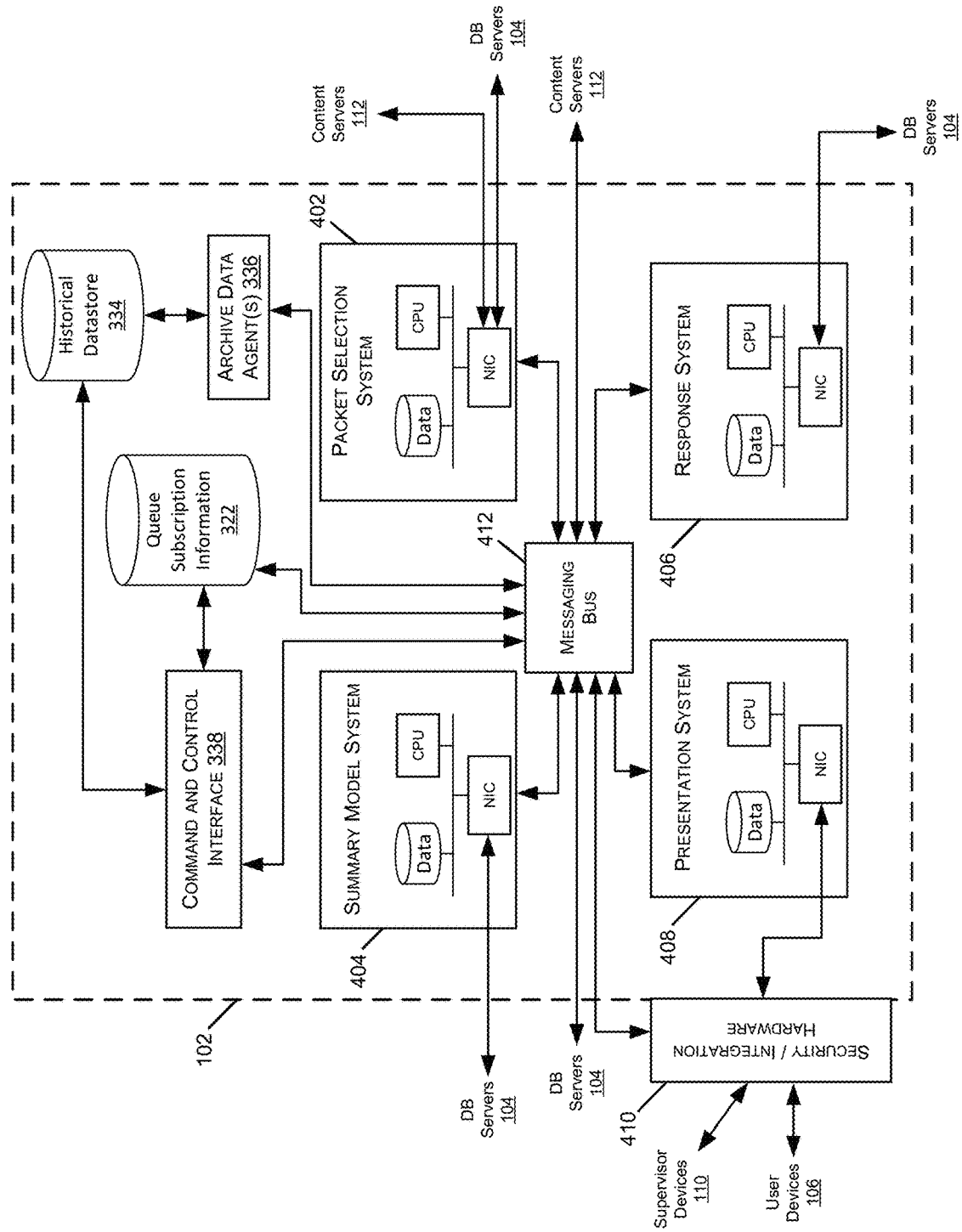
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; form reliability; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can optionally allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 338 various data streams can be selected for archiving into the historical data store 334.

Components of the content distribution network 100 outside of the server 102 can also gather information that is reported to the server 102 in real-time, near real-time, or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribers or just a subset. For example, a component of the content distribution network 100 outside of the server 102 may report a user response, but define an identifier of that user as a private variable that would not be passed to processing subscribers lacking access to that user and/or authorization to receive that user data. Processing subscribers having access to that user and/or authorization to receive that user data would receive the subscriber identifier along with response reported to that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information.

The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber, if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of message in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. In some embodiments, the internal processing subscribers 402-408 can receive a request for creation of a form, receive filter inputs from the user, provide content components corresponding to the filter inputs to the user, receive selections of content components for inclusion in the form, calculate a reliability of the form, generate recommended changes to the form, store the form, provide the form to a user, receive responses to the provided form, evaluate the responses, generate a score characterizing the received response, update information relevant to the user, generate and provide an intervention or intervention recommendation, and provide the updated information relevant to the user.

The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-408, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets or content components, for providing to a user. In some embodiments, the recommendation engine can identify one or several content components for removal from a form and/or one or several content components for inclusion in a form. In some embodiments, these one or several content components can be identified based on their impact on the one or several scores or statistical measures characterizing the form.

In some embodiments, for example, the reliability of a form may be too low as compared to a threshold value. In such an embodiment, one or several content components in the form that are responsible for decreasing the reliability of the form can be identified for removal from the form and/or can be removed from the form. Similarly, in some embodiments in which the reliability is too low, one or several content components that are not in the form can be identified for inclusion in the form and/or can be included in the form. In some embodiments, one or several content components identified for inclusion in the form and/or identified for removal from the form can be identified to the creator of the form for confirmation of the removal of those one or several content components from the form and/or for the confirmation of the addition of those one or several content components to the form.

These content components can be selected based on, for example, the information retrieved from the database server 104 including, for example, the user profile database 301, the content library database 303, the model database 309, or the like. In some embodiments, these one or several data packets can be adaptively selected and/or selected according to one or several selection rules, to the determine reliability of a form or draft form, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like. In some embodiments, the summary model system 404 can generate a model, based on user response data, identifying a user's progress over time in developing a skill, an attribute, or the like. In some embodiments, this can include receiving a raw score generated by, for example, the response system 406 (discussed below), and generating a standardized score from that raw score. In some embodiments, for example, this can include the generation of a T-score from the raw score. In some embodiments, the T-score can be a standardized score that is positive and that has a mean of 50. In some embodiments, the T-score can characterize the number of standard deviations a raw score is above or below a mean. In some embodiments, the T-score can be used to standardize for age, gender, or any other attribute.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102.

The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100.

The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
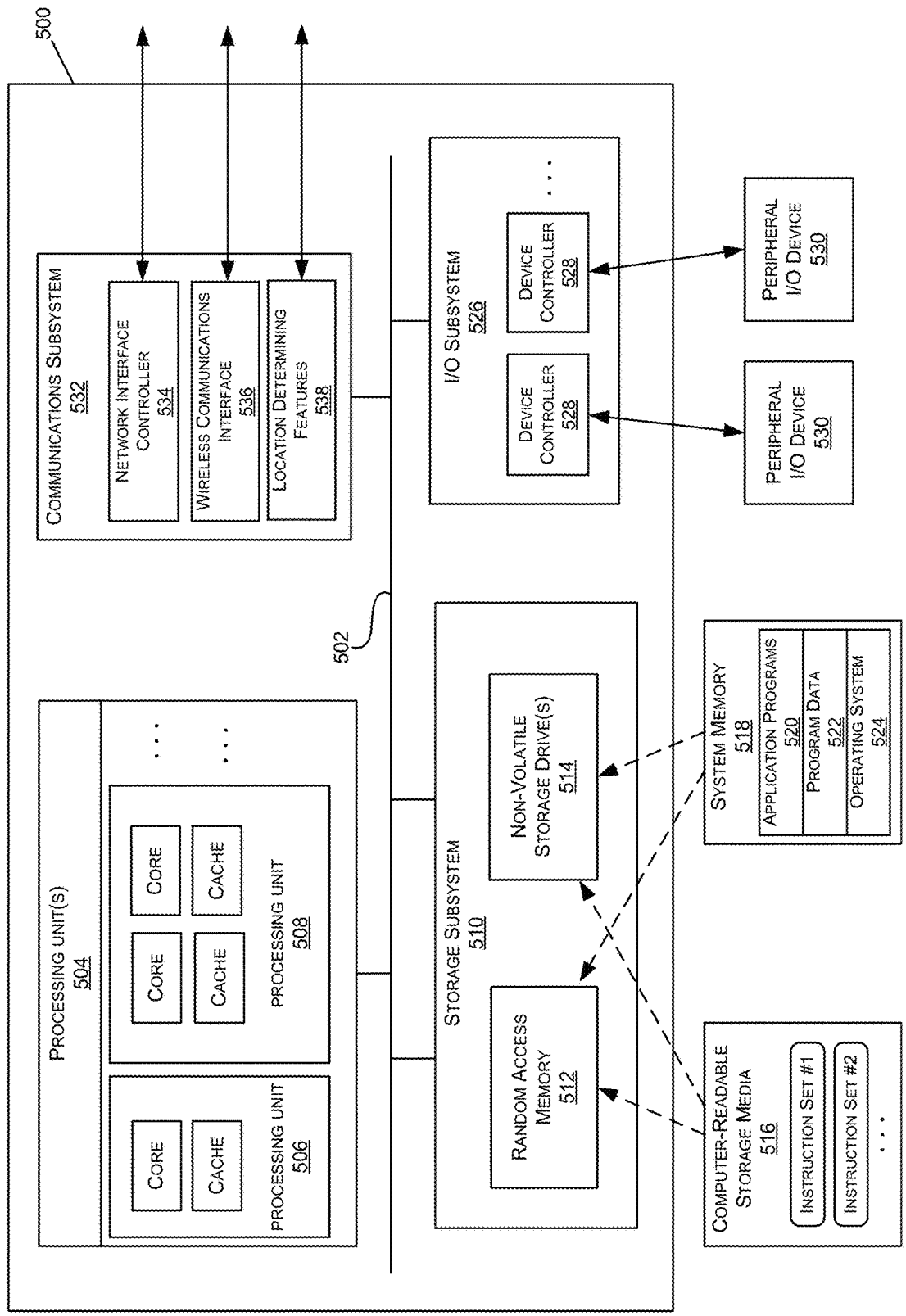
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I10 subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.)

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
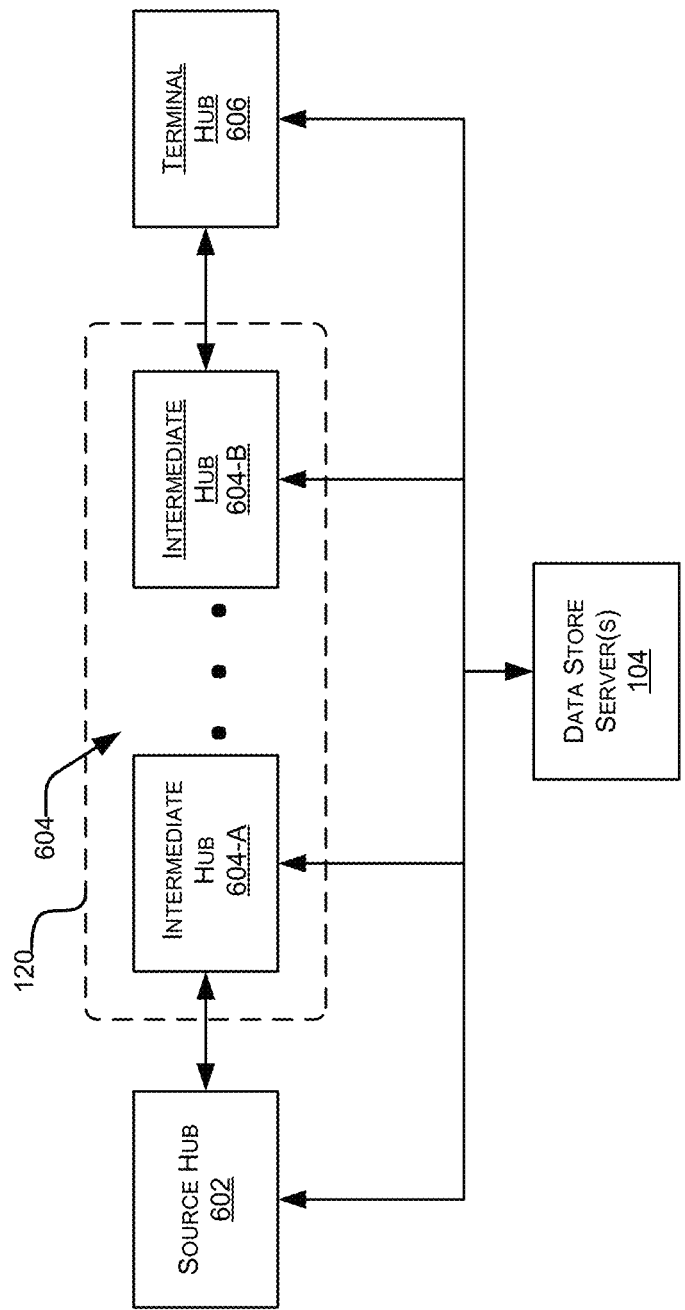
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiment, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
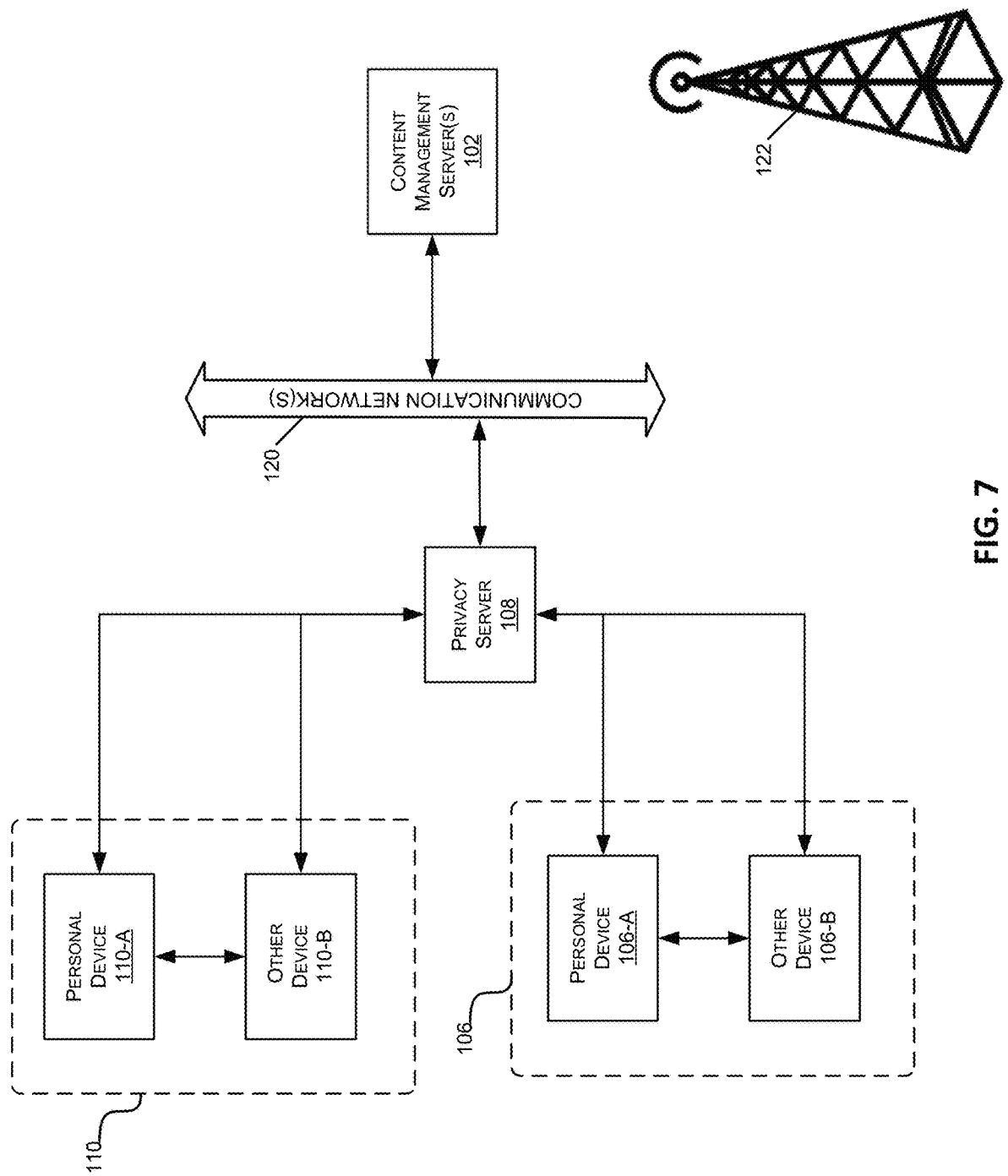
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor devices 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert. In some embodiments, the prompt can comprise an alert configured to trigger activation of the I/O subsystem of a user device 106 of a follow-up user, also referred to herein as a second user device, to provide a notification of the exceeded threshold.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using any other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
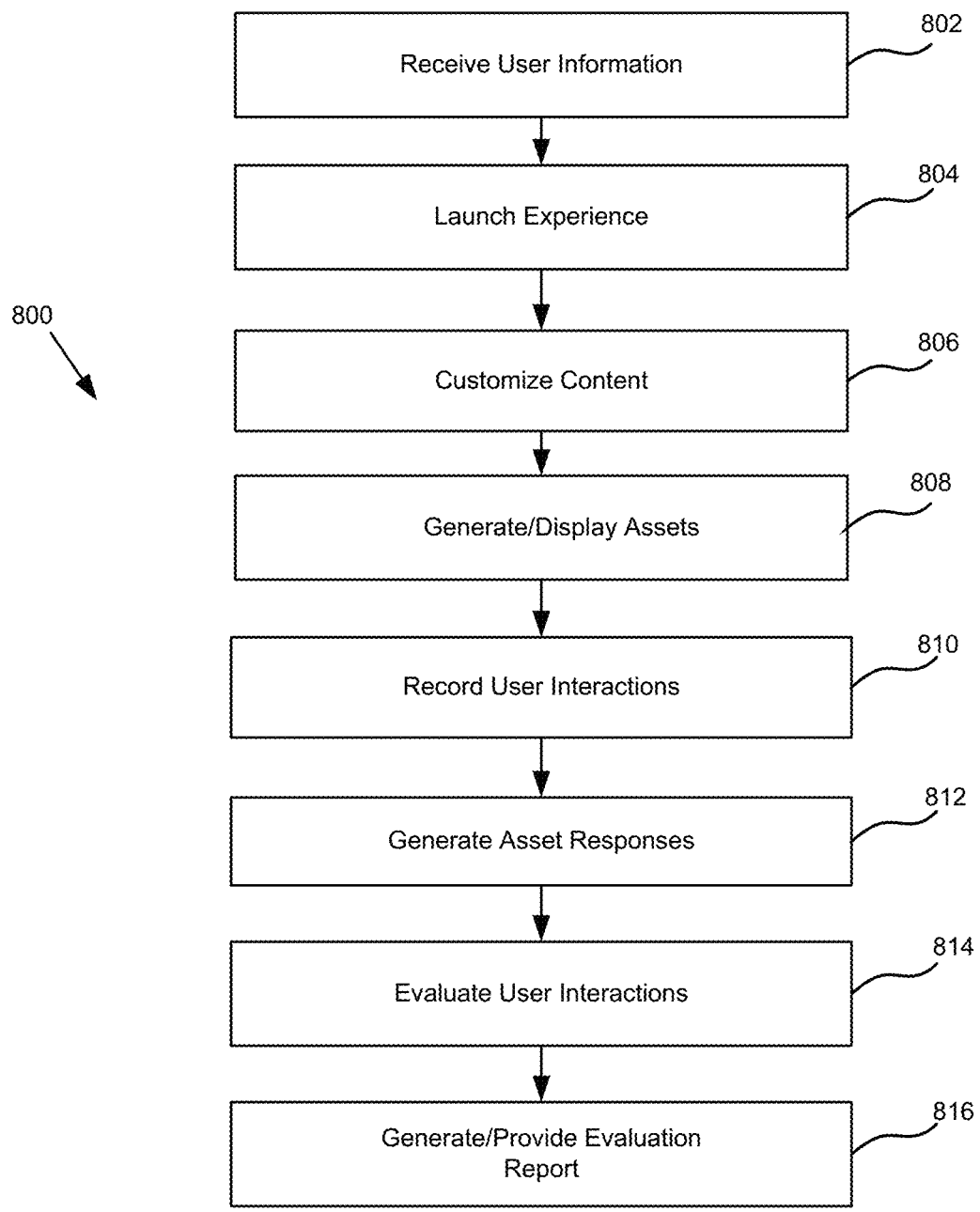
FIG. 8 is a flowchart illustrating one embodiment of a process for evaluating an assessment.

With reference now to FIG. 8, a flowchart illustrating one embodiment of a process 800 for evaluating an assessment is shown. The process 800 can be performed by the CDN 100 or components thereof. The process 800 begins at block 802, wherein user information is received. In some embodiments, the user information can be received from the user device 106 or by the server 102. The user information can include, for example, information identifying the user such as login information. In some embodiments, this information identifying the user can be server 102 to validate the identity of the user and/or to generate a secure connection with user. This user information can further include user metadata which can, for example, include information relating to one or several passenger actions of the user with the content distribution network 100 and an experience provided thereby. This information can identify, for example, one or several assets previously provided to the user and/or previous user performance.

After the user information has been received, the process 800 proceeds to block 804 wherein the experience, and specifically, the virtual experience is launched. In some embodiments, the experience can be launched by the server 102 which server 102 can send one or several signals directing launch of the experience to the user device 106. In some embodiments, these one or several signals can result in the generation of a virtual world or virtual environment by the user device 106. In some embodiments in which the user device 106 comprises, for example, a virtual reality headset or an augmented reality headset, virtual world can be presented to the user via the headset as either a virtual reality or an augmented reality. In some embodiments, the launched experience can allow the display of assets to the user and the interaction of user with these assets.

After the experience has launched, the process 800 proceeds to block 806 wherein content in the experience is customized. In some embodiments, this content can be customized based on user information received in block 802. This customization can include, for example, customization to assets provided to the user, customization of one or several setting within the user device such as, for example, customization of volume, brightness, pupil spacing, or the like, customization to the virtual world, or the like. In some embodiments, for example, the customization can include determining not to provide some assets to the user as those assets were previously provided to the user in the experience. In some embodiments, customization can include the modification to the position and/or placement of one or several assets in the virtual world based on one or several user preferences as indicated in the user information retrieved and/or received in block 802. In some embodiments, for example, the height at which the assets are provided can be modified to correspond to and/or to roughly correspond to the height of the user.

After the content of the experience has been customized, the process 800 proceeds to block 808 wherein one or more assets are generated and displayed. In some embodiments, this can include the generation of control signals by the server 102 directing the generation and/or display of one or several assets to the user via the user device 106. In some embodiments, the plurality of assets can be generated and arrange in the virtual world in a circle around a position of the user at the time of the generation and/or display the assets. In some embodiments, the assets can be generated and/or displayed according to the customization performed in block 806.

After the assets have been generated and/or displayed, the process 800 proceeds to block 810 wherein one or several user interactions with the assets are recorded. In some embodiments, these interactions can include the movement of the user throughout the virtual world, the viewing of the virtual world and/or of the assets by the user, the verbal interaction of the user with one or several of the assets, virtual physical manipulation of one or several of the assets, the grouping of one or several of the assets, or the like. In some embodiments, sensors within the user device 106 can detect the interactions of the user with a virtual world and specifically with the assets and can convert these detect interactions into electrical signals which can be provided to the server 102. These can include, for example, electrical signals corresponding to recordings of verbal communication by the user, gyroscopic and/or accelerometer signals indicating movement of the user through the virtual world and/or viewing direction of the user, or the like.

After these user interactions been recorded, the process 800 proceeds to block 812 wherein one or several asset responses are generated. In some embodiments, for example, the asset can respond to one or several of the user interactions. In some embodiments, for example, the user can verbally interact with the asset via, for example, the posing of one or several questions to the asset. The content distribution network 100 can evaluate a recording of the posed question and can generate and provide a response to that question to the user as if the response were provided by the asset. In some embodiments the user can manipulate the asset to, for example, change the size of the asset, open the asset, access interior portions of the asset, or the like. In some embodiments, the asset responses to these interactions can include the growing or shrinking to match the change size, the opening or allowing access to interior portions of the asset, or the like. The asset responses can be generated by the server 102 and can be provided to the user by the user device 106 based on one or several control signals or information received by the user device 106 from the server 102.

After the asset responses been generated and/or provided, the process 800 proceeds to block 814 wherein the one or several user interactions are evaluated. In some embodiments, this can include evaluation of verbal interactions of the user with the asset, and/or the interactions of the user with a virtual world including, for example, the movement of the user through the virtual world or the viewing of the world by the virtual user, the viewing of the asset by the virtual user, the manipulation of the asset by the virtual user, the grouping of the asset by the virtual user, or the like. In some embodiments, the user interactions can be evaluated according to one or several models retrieved from the model database 309 which models can be, for example, one or several machine learning models, one or several machine learning algorithms, and/or one or several classifiers. These one or several models can be implemented by the server to generate the evaluation of the user interactions with virtual world and/or with the assets.

After the user interactions and been evaluated, the process 800 proceeds to block 816 wherein an evaluation report is generated and/or provided. In some embodiments, this can include the providing of the evaluation generated in block 814 and/or representation such as, for example, a graphical representation, of the evaluation generated in block 814 to the user via the user device 106 and/or to user's supervisor such as the user's teacher via the supervisor device 110. In some embodiments, the step of block 816 can include the generation of a user interface and/or dashboard by the user device 106 and/or the supervisor device 110 according to control signals generated by the server 102 and sent to the user device 106 and/or the supervisor device 110 by the server 102.

Figure 9:
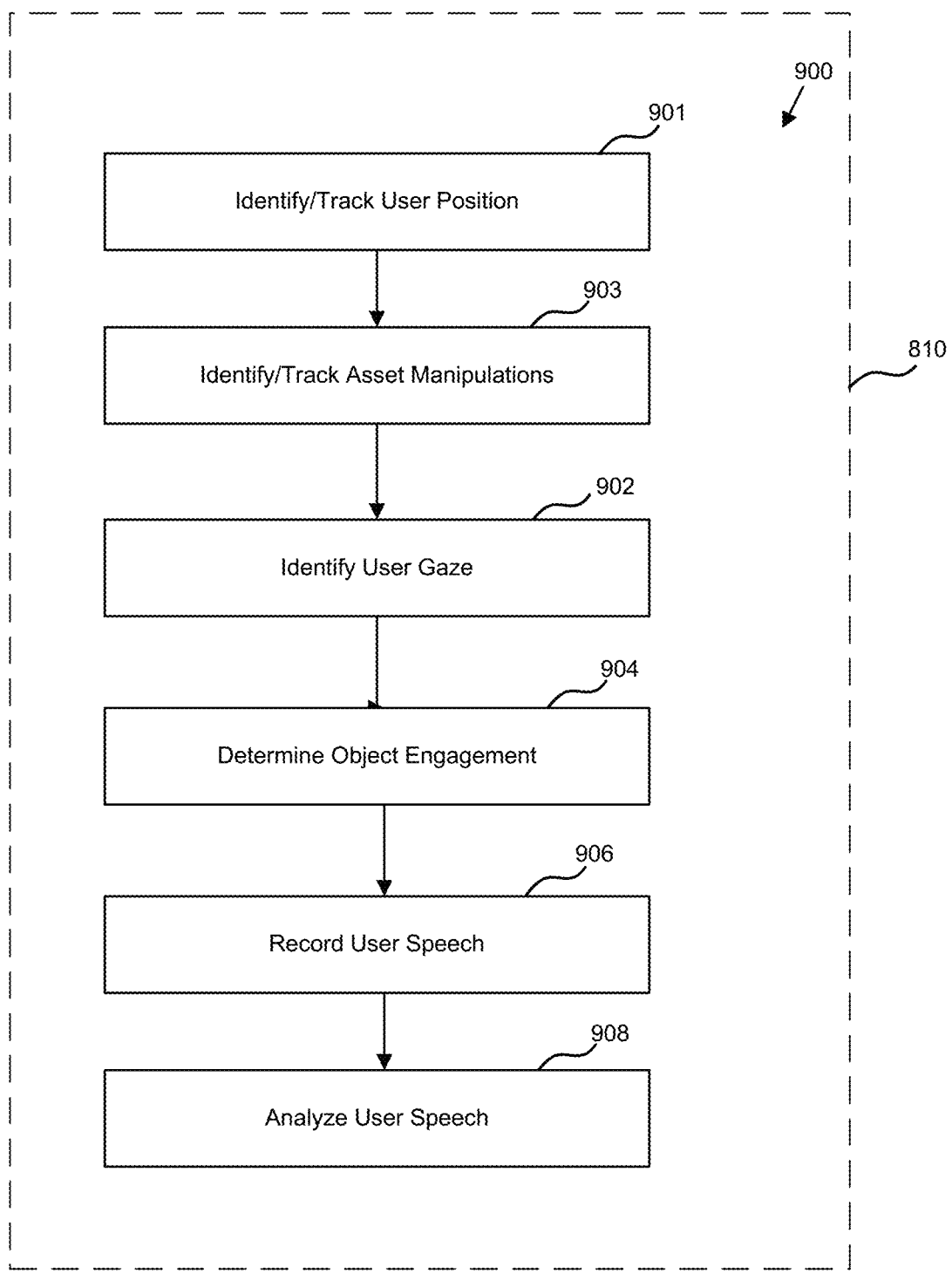
FIG. 9 is a flowchart illustrating one embodiment of a process for recording user interactions with the virtual world.

With reference now to FIG. 9, a flowchart illustrating one embodiment of a process 900 for recording user interactions with the virtual world is shown. The process 900 can be performed by all or portions of the content distribution network 100 and can be performed in the place of or as a part of the step of block 810 of FIG. 8. The process 900 begins at block 901, wherein a user location is identified and/or tracked. In some embodiments, this position can be the position of the user in the virtual world, which is generated and/or created as part of the launch of the experience of block 804 of FIG. 8. In some embodiments, this position is tracked by tracking the user's position in the real world, generating and/or applying a common coordinate or orientation system to the real world and the virtual world, and identifying the location position and/or location of the user in the virtual world based on the common coordinate and/or orientation system.

At block 903 of the process 900, one or several object manipulations are identified and/or tracked. In some embodiments, this can include tracking and/or continuously tracking the state of the one or several objects and/or assets in the virtual world. This can include tracking and/or identifying the current state of the one or several objects and/or assets in the virtual world, tracking modifications to one or several of the one or several objects and/or assets, and/or tracking the original state of the object and/or any modifications or changes to the object. This identification and/or tracking can be performed by the server 102.

At block 902 the user gaze is identified. In some embodiments, this can include determining what the user is viewing within the virtual world, whether the user is viewing one of the assets, and/or which of the assets the user is viewing. In some embodiments, this determination can be made according to electrical signals received from sensors in the user device 106 which signals can identify location of the user within the virtual world and/or identify a direction the user is looking in the virtual world.

After the user gaze is been identified, the process 900 proceeds to block 904 for wherein asset engagement is determined. In some embodiments, for example, it can be determined that the user has engaged one or several assets in the virtual world based on the user interaction with the virtual world and/or the user's gaze. In some embodiments, the user can provide an input or signal indicative of engagement of an asset this can include, for example, gazing at an asset for a predetermined amount of time, clicking on the asset, reaching for the asset, via a verbal command, or the like. The determination of asset engagement can be performed by the server 102.

After the asset engagement has been determined, the process 900 proceeds to block 906 wherein user speech or verbal interaction is recorded. In some embodiments, user speech can be recorded by the user device 106, and specifically by one or several sensors of the user device 106 such as, for example, one or several microphones. This speech can be recorded the entire time that the user is in the virtual world or subsequent to the receipt of a signal from the user indicative of a request to start recording of speech.

After the user speech has been recorded, the process 900 proceeds to block 908 wherein the user speech is analyzed. In some embodiments, for example, the recorded user speech can be transmitted to the server 102 by the user device 106 and/or can be provided to the server 102 by the user device 106. This recorded user speech can then be analyzed by the server 102 according to one or several of the model stored in the model database 309 such as, for example, the machine learning language model. After the user speeches and analyzed, the process 900 can return to the process 800 of FIG. 8 and can continue at block 812.

Figure 10:
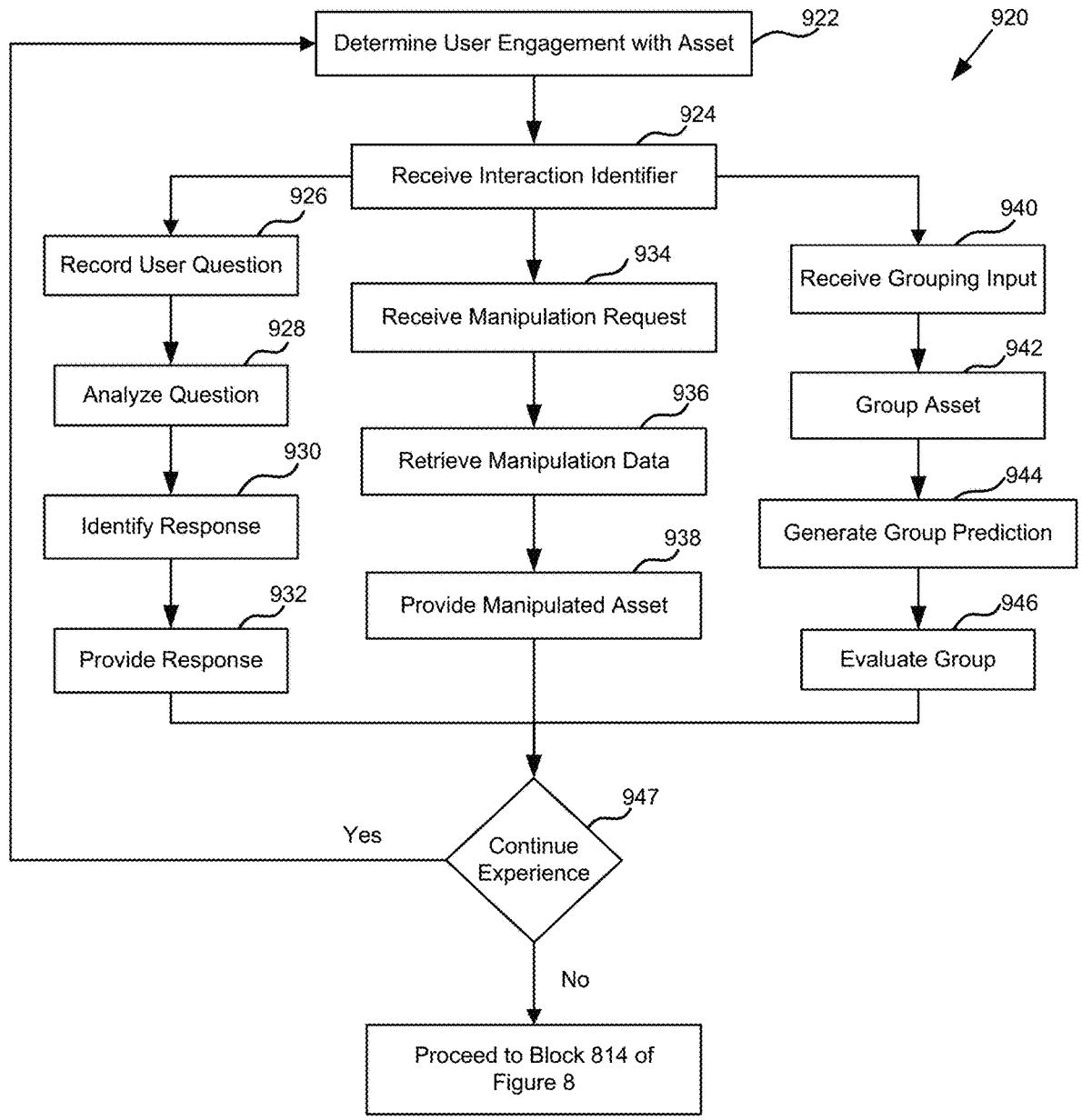
FIG. 10 is a flowchart illustrating one embodiment of a process for recording and evaluating user interactions with one or several of the assets.

With reference now to FIG. 10, a flowchart illustrating one embodiment of a process 920 for recording and evaluating user interactions with one or several of the assets is shown. The process 920 can be performed by all or portions of the content distribution network 100. The process 920 can be performed as a part of, or in the place of the steps of blocks 810 and 812 of FIG. 8. The process 920 begins a block 922 wherein user engagement with one or several of the assets is determined. In some embodiments, this engagement can be determined based on one or several user actions in the virtual world such as, for example, gazing at one the assets for more than a predetermined length of time. In some embodiments, for example, when a user gazes at one of the assets in the virtual world, a timer can be triggered which timer can be continuously compared to engagement threshold. If the timer exceeds the engagement threshold and the user can be identified as having engaged the asset. The determination of user data with one or several assets can be made by the server 102.

After engagement has been determined, the process 920 can, in some embodiments, proceed to blocks 924 through 938, wherein a manipulation process is performed. Specifically, the process 920 can proceed to block 924 wherein an interaction identifier is received. In some embodiments, the interaction identifier can be initially received by the user device 106 and can then be provided to the server 102 can thus receive the interaction identifier. In some embodiments, the interaction identifier can comprise an input received from the user specifying at least one type of intended interaction with the asset. This identifier can be received via a verbal input such as, for example, the user saying one or several words indicating this desired indication, via a user action such as, for example, via generation of a hand signal captured by the camera of the user device 106, or via an input to a user interface of the user device 106. In some embodiments, the identifier can specify, for example, a verbal interaction, a manipulation, or a grouping.

After the interaction identifier has been received, and if the verbal interaction is identified by the interaction identifier received in block 924, the process 920 proceeds to block 926 through 932, wherein a speech capture and analysis process is performed. Specifically, the process 920 proceeds to block 926 wherein user speech, and specifically a user question, comment, or statement is recorded. In some embodiments, the user speech can be sensed by the microphone of the user device 106 and the user device 106 can record the speech by forming an audio files such as, for example, a waveform audio file (WAV) file. This WAV file can be stored by the user device in local memory on the user device 106 and/or can be stored in the database server 104 and specifically in user profile database 301 of the database server 104.

After the user speech has been recorded, the process 920 proceeds to block 928 wherein the user speech, and specifically wherein a user question, comment, and/or statement is analyzed. In some embodiments, this can include one or several natural language processing steps or analyses to ascertain the quality of the speech or question and the subject of the speech or question. In some embodiments, this analysis can include evaluation of the user speech to determine one or several attributes of the speech and/or of the user. These can include, for example, determining indicia of effort, understanding, mental strain, mood, state of mind, learning, or the like. This natural language processing can include the converting of the speech to text, the parsing of the text, the identifying of one or several keywords in the text, natural language understanding, or the like. The analysis of the speech can be performed by the server 102, and specifically by a model, classifier, algorithm, or the like, which can be located on the server, and which model, classifier, algorithm, or the like can be a machine learning and/or artificially intelligent model, classifier, algorithm, or the like.

After the speech has been analyzed, the process 920 proceeds to block 930 wherein response to the speech is identified. In some embodiments, in which the speech comprises a question, the response to the speech can comprise an answer to the question posed by the user. In some embodiments, the response can be identified based on information and/or data relating to the asset stored in the database server 104 and specifically in the content library database 303, and in some embodiments, this response can be identified based on information retrieved, for example, in real-time from one or several online sources. In embodiments in which the response is identified based on information retrieved in real-time from one or several online sources, a search can be done for online sources of information relevant to the asset, these online sources can be scraped for information relevant to the posed question, and a machine learning model can identify all or portions of this scraped information as the response. In embodiments in which the response is selected from data relating to the asset stored in the database server 104, this information can identify one or several attributes of the asset, which one or several attributes can form the response. In some embodiments, the response can be identified according to a machine learning model which can, based on one or several keywords in the speech and/or the output of the natural language understanding of the speech identify data most likely to form a response to the speech. The response can be identified by the server 102.

After the responses been identified, the process 920 proceeds to block 932 wherein a response is provided. In some embodiments, the providing the response can include the conversion of the identified response into natural language and the generation of an audio file from that natural language. The audio file can then be played to the user via the user device 106. In some embodiments, the response can be provided to the user device by the server 102 and the response can then be provided to the user via the user device 106.

Returning again to block 924, if it is determined that a manipulation of the asset is identified, then the process 920 proceeds to block 934 wherein a manipulation request is received. In some embodiments, the manipulation request can comprise request to manipulate the asset with which the user is engaging. This manipulation request can comprise a request to, for example, change the size of the asset, open the asset, access one or several interior portions of the asset, deform, move, or rearrange the asset, or the like. The manipulation request can be received by the server 102 from the user device 106.

After the manipulation request is then received, the process 920 proceeds to block 936 wherein manipulation data is retrieved. In some embodiments, the manipulation data can be retrieved from the database server 104 and specifically from the content library database 303. In some embodiments, the manipulation data can specify how and/or the degree to which the asset can be manipulated. After the manipulation data has been received the manipulation data can be retrieved from the database server 104 by the server 102.

After the manipulation data has been retrieved, the process 920 proceeds to block 938 wherein the asset is manipulated according to manipulation data in the received manipulation request and manipulated asset is provided in the virtual world to the user. In some embodiments, this can include the generation and sending of one or several control signals from the server 102 to the user device 106 specifying the desired manipulation. These one or several signals can be converted by the user device 106 into the generation of the manipulated asset within the virtual world.

Returning again to block 924, if it is determined that a grouping of the asset is identified, then the process 920 proceeds to blocks 940 through 946, wherein a grouping process is performed. Specifically, the process 920 can proceed to block 940 wherein a grouping input is received. In some embodiments, the grouping input can comprise one or several inputs received from the user device 106 by the server 102 that indicate a grouping of one or several assets and/or direct for the grouping of one or several assets. In some embodiments, this input can comprise, for example, an input directing movement of the virtual asset to a portion of the virtual world wherein or whereon a group is formed. In some embodiments, for example, this can include moving one or several of virtual assets to a virtual table within the virtual world which table can be, for example, color-coded.

After the grouping input has been received, the process 920 proceeds to block 942 wherein the one or several assets identified in the grouping input are grouped according to the grouping input. In some embodiments this can include the generation of one or several control signals that can, for example, control the user device display one or several groupings of one or several assets. In some embodiments, in addition to the controlling of the user device 160 display the one or several assets as group, grouping of the assets as indicated in block 942 can further include updating data within the database server to identify the grouping and/or to associate the identified grouping with the user creating the grouping. In some embodiments, for example, this can include updating the user database 301 and specifically updating the grouping database within the interaction sub database of the user profile database 301.

After the one or several assets have been grouped, the process 920 proceeds to block 944 wherein a group prediction is generated. In some embodiments, the group prediction can comprise a prediction of a predicted grouping reason, which predicted grouping reason can be the reason for the grouping of one or several assets into one or several groups. In some embodiments, the predicted grouping reason can identify one or several common traits or attributes of the one or several assets which one the basis of the grouping. In some embodiments, the group prediction can be generated by a prediction model that can be retrieved from the model database 309 and can be executed and/or implemented by the server 102.

After the group prediction has been generated, the process 920 proceeds to block 946 wherein the group is evaluated. In some embodiments, this evaluation can be performed by the evaluation model, which can be retrieved from the model database 309 and implemented and/or executed by the server 102. In some embodiments, the evaluation model can be configured to generate an evaluation of the grouping based on the predicted grouping reason and/or based on the actual grouping reason. In some embodiments, this evaluation can identify a cognitive level of the reason for grouping.

After the response has been provided in block 932, after the manipulated asset has been provided in block 938, and/or after the grouping has been evaluated, the process 920 proceeds to decision state 947 where it is determined whether to continue the experience. In some embodiments, this can include determining whether all the actions in the experience have been taken and/or completed, determining whether a user input indicative of termination of the experience has been received, or the like. If it is determined to continue the experience then the process 920 returns to block 922 and continues as outlined above. If it is determined to terminate the experience, then the process 920 proceeds to block 948 and continues with block 814 of FIG. 8.

Figure 11:
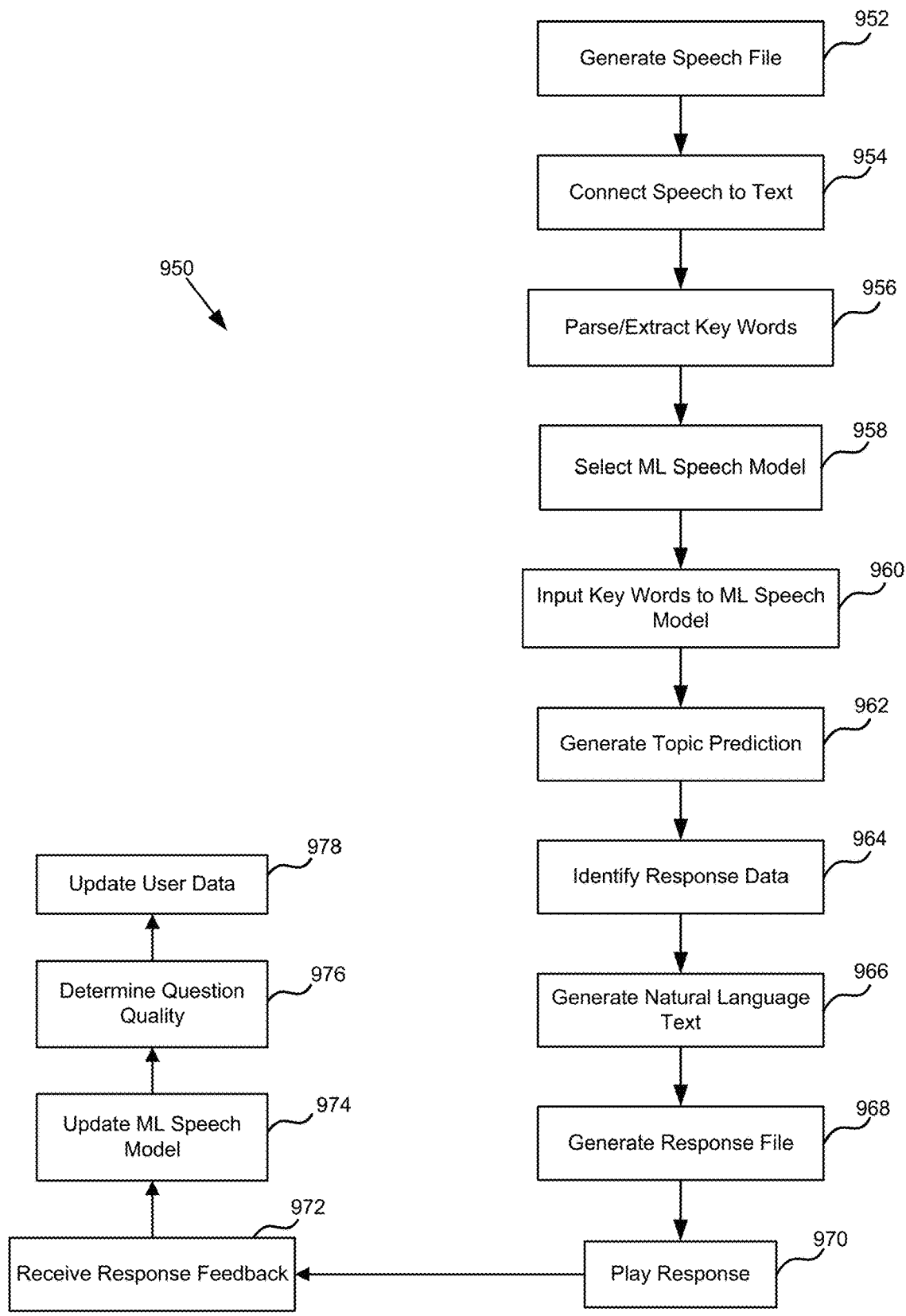
FIG. 11 is a flowchart illustrating one embodiment of a process for analyzing speech.

With reference now to FIG. 11, a flowchart illustrating one embodiment of a process 950 for analyzing speech is shown. In some embodiments, the process 950 can be performed as a part of, or in the place of the step of block 928 through 932 of FIG. 10. The process 950 can be performed by all or portions of the content distribution network 100. The process 950 begins at block 952 wherein a speech file is generated. In some embodiments, the speech file can be generated locally at the user device 106 or at the server 102 based on information's captured by one or several microphones of the user device 106. The speech file can comprise an electronic file recording the speech and/or question. In some embodiments, the speech file can comprise a WAV file.

After the speech file has been generated, the process 950 proceeds to block 954 wherein the speech file is converted to text. In some embodiments this can include the use of natural language processing algorithm such as, for example, speech-to-text algorithm. The conversion of the speech file to text can be performed by the server 102. After the speech of the speech file has been converted to text, the process 950 proceeds to block 956 wherein the text is parsed and/or wherein one or several keywords are extracted from the text. In some embodiments, this can include the creation of language features based on a parse tree, identification parts of speech, identification of one or several phrases such as noun phrases, or the like. In some embodiments, this can further include an evaluation of the text to identify a quality of the text which can include, for example, an identification of one or several grammatical errors in the text, an identification of the complexity of the text, the semantic features of the text, or the like. The parsing and/or extracting one or several keywords can be performed by the server 102.

After the parsing and/or extracting of one or several keywords has been performed, the process 950 proceeds to block 958 wherein a machine learning language model, also referred to herein as a machine learning speech model is selected. In some embodiments, the machine learning language model can be selected from the one or several machine learning language models stored in the model database 309. In some embodiments, the machine learning language model can be selected that corresponds to and/or is specific to the asset with which the user is interacting. In other words, in some embodiments, the machine learning speech algorithm is specific to the at least one virtual asset for which the data indicative of the interaction was received, or alternatively, the machine learning algorithm is specific to the at least one virtual asset with which the user is engaged. As a part of the selection of the machine learning language model, the selection machine learning language model can be implemented and/or executed by the server 102.

After the machine learning language model has been selected, the process 950 proceeds to block 960 wherein the one or several extracted keywords and/or language features and/or information relating to the user is inputted into the machine learning language model selected in block 958. In some embodiments, this can include the formatting of the one or several extracted keywords and/or language features and/or the formatting of one or several attributes of the user so as to allow the inputting of the one or several extracted keywords and/or the one or several attributes of the user into the selection machine learning language model. After the one or several extracted keywords and/or one or several user attributes have been inputted into the machine learning language model, the process 950 proceeds to block 962, wherein a topic prediction is generated by the machine learning language model. In some embodiments, the topic prediction can be the output of the machine learning language model based on the inputted one or several extracted keywords and/or the one or several user attributes. In some embodiments, the topic prediction can correspond to one or several traits or attributes of the asset, which one or several traits or attributes can be stored in the content library database 303.

After the topic prediction has been generated, the process 950 proceeds to block 964 wherein response data is identified. In some embodiments, the response data corresponds to the topic prediction block 962, and specifically can be one or several of the one or several traits or attributes of the asset. In some embodiments, the response data can be identified by matching the generated topic prediction to the one or several traits or attributes stored in the content library database 303. The response data can be identified by the server 102.

After the response data has been identified, the process 950 proceeds to block 966 wherein natural language text is generated based on the identified response data. In some embodiments, this can include the generation of one or several sentences containing the identified response data. In some embodiments, this can be performed by the server 102 using a natural language generation algorithm. After the natural language text for the response data has been generated, the process 950 proceeds to block 968, wherein a response file is generated. In some embodiments, this can include converting the text generated in block 966 to electronic sound files such as, for example, a WAV file. The response file can be generated by the server 102 and sent to the user device 106 and/or can be generated by the user device 106. After the response file has been generated, the process 950 proceeds block 970 wherein response file is played to the user via, for example, the user device 106.

After the playing of the response, the process 950 proceeds block 972 where in response feedback is received. In some embodiments, for example, after the responses provided to the user, the user can be prompted for feedback as to whether the response properly answer the question and/or responded to their speech input. In some embodiments, the response feedback can comprise an indication of whether the response answered the question and/or the degree to which the response answered the question.

After the response feedback has been received, the process 950 proceeds block 974 wherein the machine learning language model is updated. In some embodiments, the machine learning language model can be updated based on the inputs into the machine learning language model, the identified topic prediction, and the response feedback. In some embodiments, this updating the speech model can improve the performance of the speech model by providing feedback on previous training and/or by allowing further training of the machine learning language model. The machine learning language model can be updated by the server 102 and the update can be stored in the model database 309.

After the machine learning language model has been updated, the process 950 proceeds to block 976 wherein the question quality and/or the quality of the speech is determined. In some embodiments, the quality of the speech and/or question can be determined. In some embodiments, the quality of the speech and/or question can be determined based on outputs of step 956 which can include the identification of the quality of the text which can include, for example, an identification of one or several grammatical errors in the text, an identification of the complexity of the text, the semantic content or the like. The question quality can be determined by the server 102.

After the question quality has been determined, the process 950 proceeds to block 978, wherein the user data is updated. In some embodiments, this can include an update to user data stored within the user profile database 301. This update can include the determined question quality. The user data can be updated by the server 102.

Figure 12:
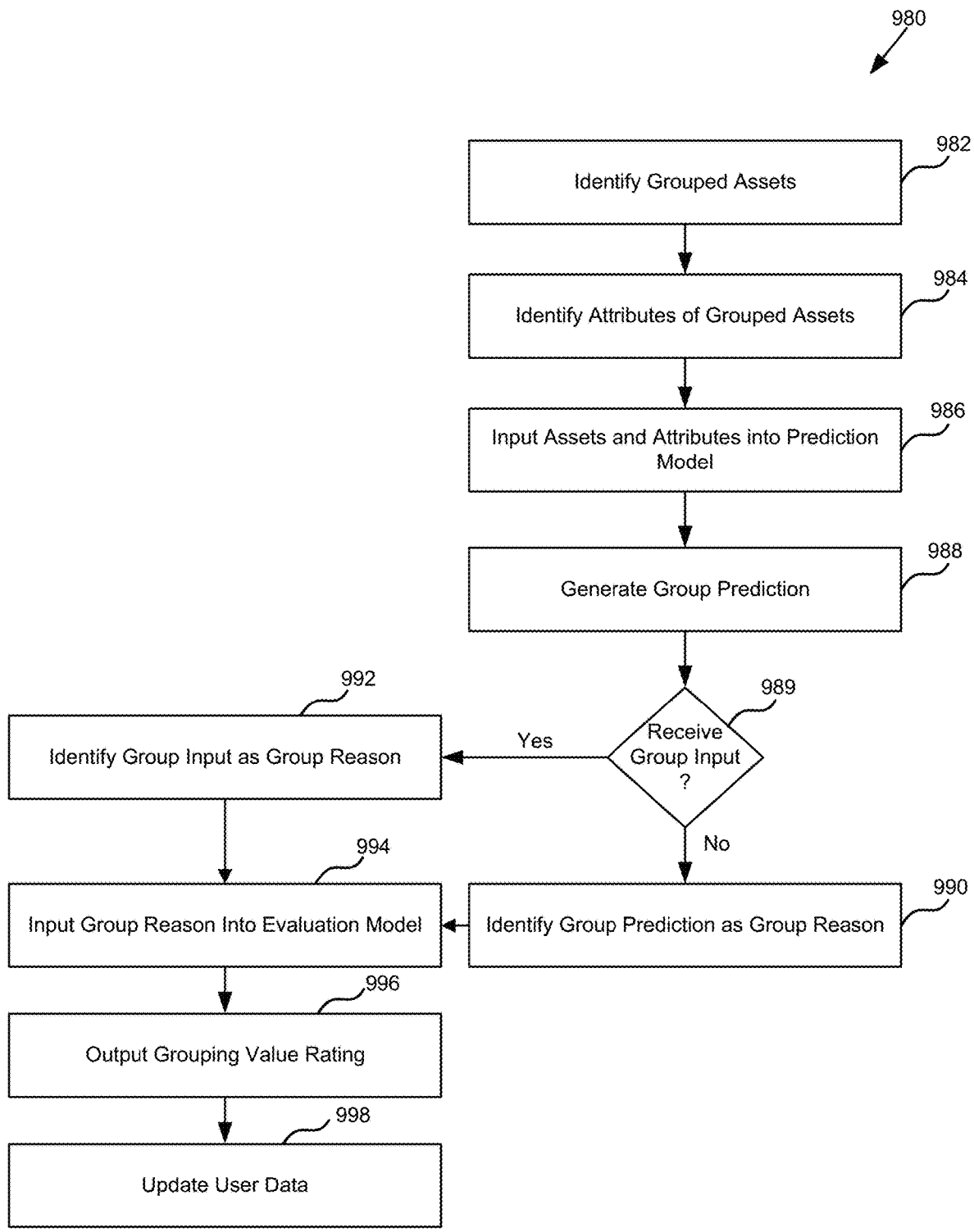
FIG. 12 is a flowchart illustrating one embodiment of a process for evaluating a grouping of assets.

With reference now to FIG. 12, a flowchart illustrating one embodiment of a process 980 for evaluating a grouping of assets is shown. The process 980 can be performed as a part of, or in the place of steps 944 and 046 of FIG. 10. The process 980 can be performed by all or portions of the content distribution network 100. The process 980 begins at block 982, wherein the one or several grouped assets are identified. In some embodiments, this can include identifying and/or selecting one group and identifying the assets within the identified and/or selected group. This identification of the grouped assets can be performed by the server 102. After the grouped assets have been identified, the process 980 proceeds to block 984 wherein traits and/or attributes of the grouped assets identified. In some embodiments this can include retrieving traits and/or attributes for each of the identified assets from the content library database 303.

After the traits and/or attributes of the identified grouped assets have been identified, the process 980 proceeds to block 986 wherein the assets and/or asset attributes are input into the prediction model. In some embodiments, the prediction model can be configured to, based on the assets and/or the attributes or traits of the assets, generate a prediction of a reason for forming the grouping. In some embodiments, the prediction model can comprise a regression model. After the assets and/or attributes have been inputted into the prediction model, the process 980 proceeds to block 988 wherein a grouping prediction, also referred to herein as a prediction grouping basis and/or predicted grouping reason is generated. In some embodiments, the group prediction can be the output resulting from the execution of the prediction model.

After the group prediction has been generated, the process 980 proceeds to decision state 989 where it is determined if a group input has been received. In some embodiments, for example, the user can be prompted to provide a grouping reason and/or grouping logic identifying why the user formed the group and/or the commonality between assets in the group after the user has completed a grouping and/or after the user has partially formed the grouping. If it is determined that no grouping input has been received, then the process 980 proceeds to block 990 wherein the group prediction is identified as the group reason. Alternatively, if it is determined that a group input has been received, then the process 980 proceeds to block 992 when the group input is identified as the group reason. In some embodiments, the receipt of the group input can be used to further train and improve the prediction model.

After the identification of the group reason, the process 980 proceeds block 994 wherein the group reason is input into an evaluation model. In some embodiments, the evaluation model can comprise code executable by the server 102, that when executed and when provided the group reason, identification of the common attributes of the assets, and/or information relating to the user, can provide an identification of the cognitive level of the grouping. In some embodiments, this can include identifying a level within a taxonomy such as Bloom's taxonomy corresponding to the cognitive level or difficulty level associated with the reason for the grouping. In some embodiments, the evaluation model can comprise a machine learning model such as, for example, a classifier that is configured to receive inputs relating to the grouping reason and, as indicated in block 996, output a grouping value rating which can be a score indicative of a cognitive level of the grouping reason, and in some embodiments can identify the level within the taxonomy associated with the grouping reason.

After the grouping value rating has been outputted, the process 980 proceeds to bock 998, wherein user data is updated. In some embodiments, the user data can be updated with the grouping value rating such that portions of the user metadata identifying a user cognitive level and/or user skill level in grouping items is affected by the grouping value rating.

Figure 13:
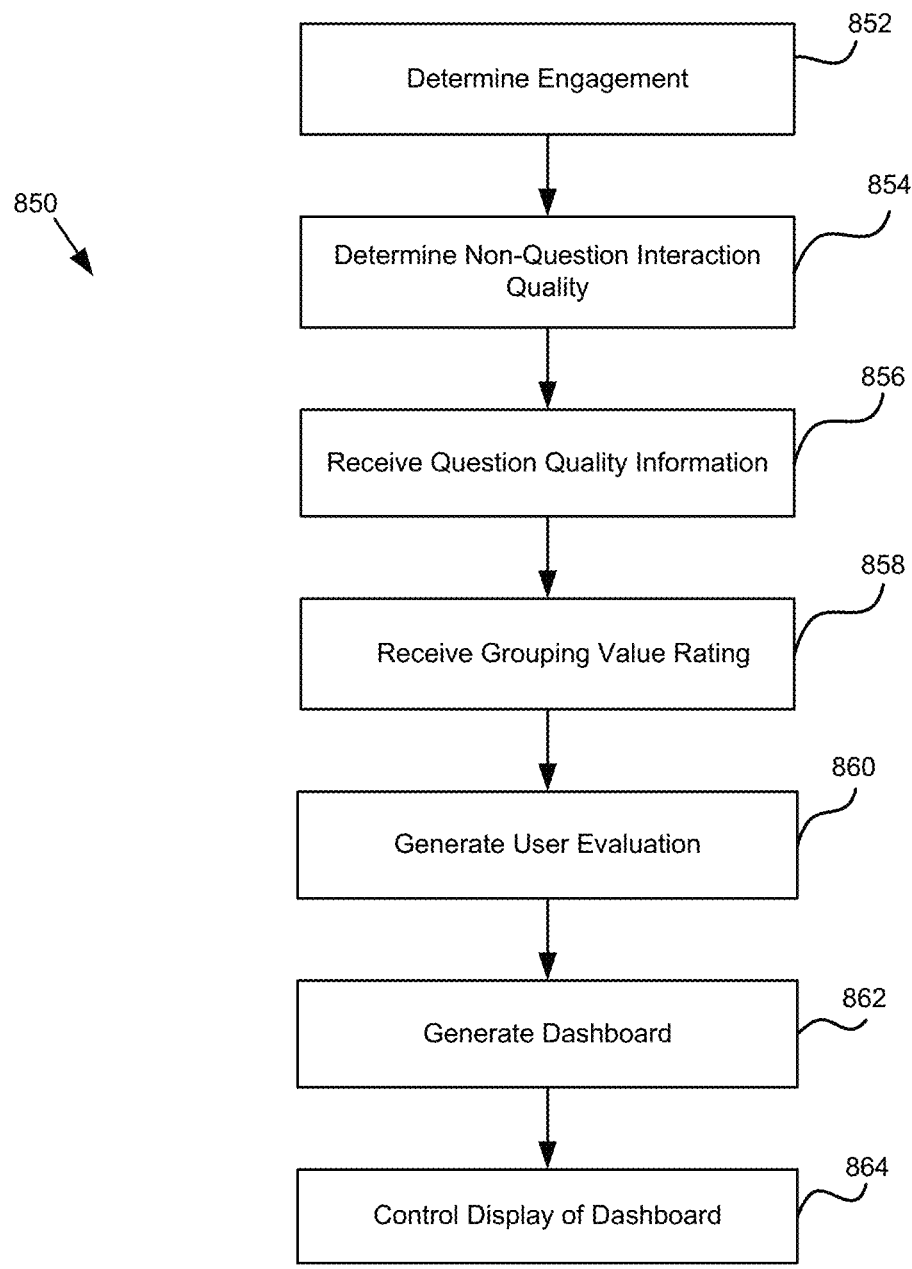
FIG. 13 is a flowchart illustrating one embodiment of a process for controlling a dashboard.

With reference now to FIG. 13, a flowchart illustrating one embodiment of a process 850 for controlling a dashboard is shown. The process 850 can be performed as a part of, or in the place of block 816 of FIG. 8. The process 850 can be performed by the content distribution network 100 or one or several components thereof. The process 850 begins at block 852 wherein engagement is determined. In some embodiments, engagement can be determined as previously discussed based on gaze and/or other interaction with the one or several assets in the virtual environment. The engagement can be determined by the server 102. After engagement is determined, the process 850 proceeds to block 854 wherein non-question interaction quality is determined. In some embodiments, for example, this can include determining the quality of manipulations of the assets, and specifically the degree to which the student is using manipulations of the asset to gain greater knowledge or understanding of the asset. In some embodiments, interaction quality can include an characterization of whether and/or how effectively the user interacts with the asset, including, both interactions and lacking interactions between the user and the asset. In some embodiments, for example, the user may not interact with one or several of the virtual assets, and thus, in some embodiments, interaction quality can be determined based at least partially on user interactions and/or based at least partially on omitted interactions between the user and the at least one of the assets. In such an embodiment, this non-interaction can impact the determined interaction quality. This determination can be made by the server 102.

In some embodiments, non-question interaction quality can be determined based on knowledge accessed via non-question interaction. This accessed knowledge is also referred to herein as a "change in state" of the asset. In some embodiments, for example, when a user interacts with the asset, a value can be associated with the interaction indicative of whether knowledge was accessed via the interactions, or in other words, whether knowledge relating to the asset is/was provided in response to the interactions. In some embodiments, this value can merely be a binary value indicating whether knowledge was accessed, and in some embodiments, this value can indicate whether knowledge was accessed and the quality and/or quantity of accessed knowledge. In some embodiments, the quality of the accessed knowledge can be determined by identifying a level of the accessed knowledge within a taxonomy such as Bloom's taxonomy. The quantity of the accessed knowledge can be determined, for example, identifying the amount of data, and more specifically new data provided to the user in response to the interaction.

After non-question interaction quality has been determined, the process 850 proceeds to block 856 wherein question quality information is received. In some embodiments, question quality can be determined as part of the process for generating response to the question. The question quality can include a determination of the change in state caused by the question and/or the amount of knowledge accessed in response to the question. In some embodiments, the determination of the quality of the question can include evaluation of the accessed knowledge by identifying a level of the accessed knowledge within a taxonomy such as Bloom's taxonomy. Information associated with this determined question quality can be stored in the database server 104 and specifically within the user profile database 301. This information can be received and/or retrieved by the server 102. After the question quality information has been received, the process 850 proceeds to block 858 wherein one or several grouping value ratings are received and/or retrieved. In some embodiments, these grouping value rating can be received and/or retrieved by the server 102 from the database server 104 and specifically from the user profile database 301.

After the grouping value rating have been received, the process 850 proceeds to block 860 wherein a dashboard is generated, and/or wherein the server 102 directs generation of the dashboard in a device 106, 110. In some embodiments, the dashboard can comprise user interface including windows that can, for example, display information relating to user actions in the virtual world, user interactions with one or several assets, evaluation of user actions in the virtual world, and/or an evaluation of one or several user groupings. The dashboard can be generated by the server 102. After the dashboard has been generated, the process 850 proceeds to block 862 wherein the display of the dashboard is controlled. In some embodiments, this can include the generation of one or several control signals by the server 102, which one or several control signals can be sent to the supervisor device 110 to control the supervisor device to display the dashboard. In some embodiments, the control of the dashboard can include the generating and sending of one or several signals from the server 102 to the device 106, 110, which one or several signals can comprise data for displaying in the dashboard.

Figure 14:
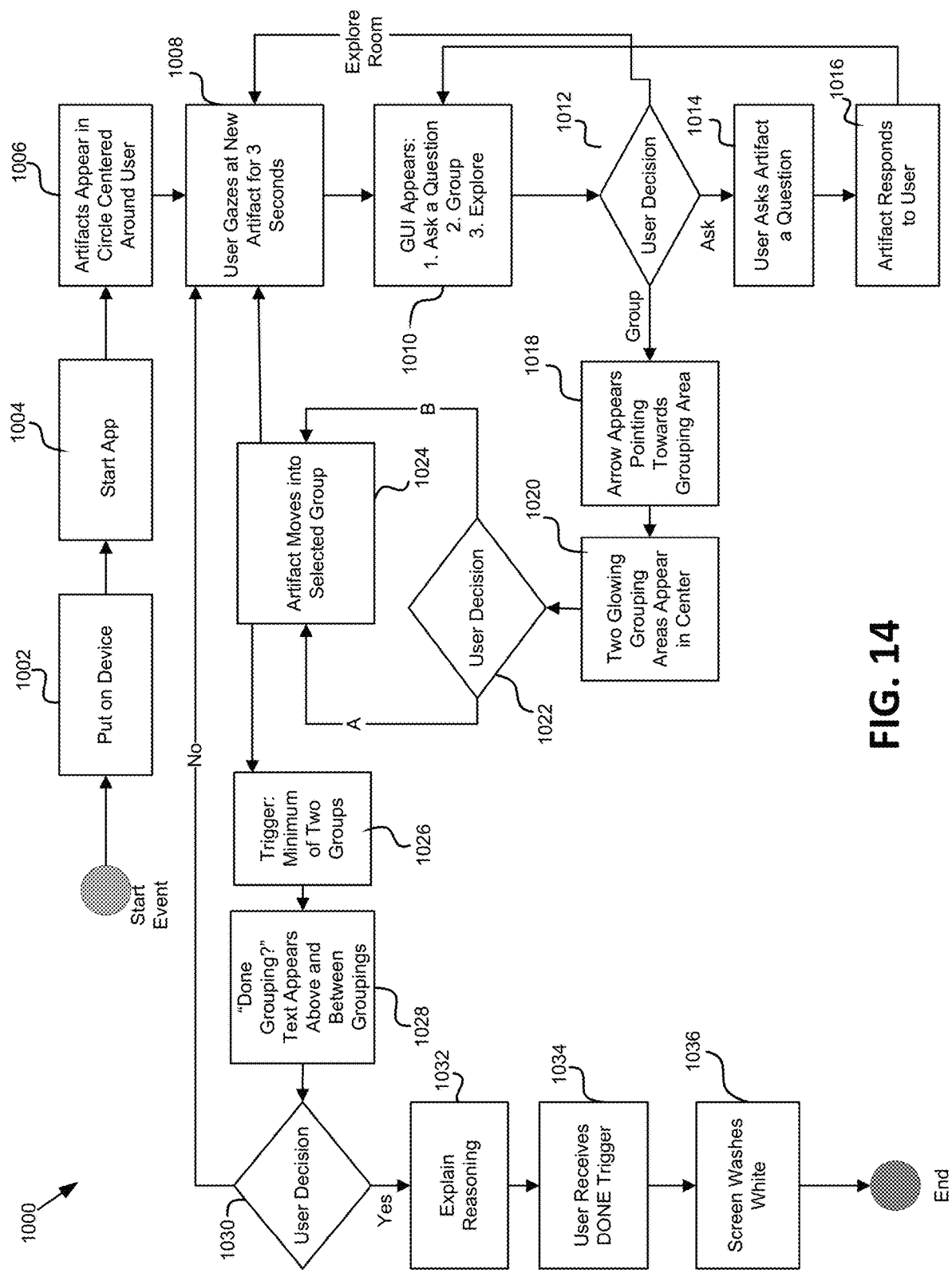
FIG. 14 is a flowchart illustrating one embodiment of a process for delivering an assessment.

With reference now to FIG. 14, a flowchart illustrating one embodiment of a process 1000 for delivering an assessment is shown. The process 1000 can be performed by all or portions of the content distribution network 100. The process 1000 begins a block 1002 wherein the user accesses or puts on the user device 106. The process 1000 and proceeds to block 1004 wherein the experience is launched an/or the app in which the experiences created is launched. In some embodiments, the experience can be launched in the user device 106.

After the experience is launched, the process 1000 proceeds block 1006 wherein the plurality of assets which can be, in some embodiments, one or several artifacts, appear in the virtual world in a circle centered around the location of the user in the virtual world. After the one or several assets appear, the process 1000 proceeds to block 1008, wherein the user engages one of the assets by, gazing at the asset for more than three seconds. After the user has engaged one of the assets, a graphical user interface is provided to the user as indicated in block 1010, which GUI allow the user to select to ask a question, to group the assets, and/or to explore or manipulate one or several of the assets. The process 1000 proceeds to decision state 1012, wherein it is determined which input is provided by the user. If the user chooses to explore, then the process 1000 can allow the exploration and/or manipulation of the asset and can then return to block 1008 and proceed as outlined above.

If the user chooses to ask a question, then the process 1000 proceeds to block 1014, wherein the user asks the after the question. This question can be recorded and analyzed as discussed above in the process 1000 and proceeds to block 1016 wherein the asset responds to the user question. After the asset response to the user question, the process 1000 returns to block 1010 and continues as outlined above.

Returning again to decision state 1012, if the user chooses to group the assets, then the process 1000 proceeds to block 1018 wherein an arrow appears in the virtual world pointing towards a grouping area. The process 1000 and proceeds to block 1020 wherein one or several areas are indicated for the grouping which areas can include, for example, to glowing areas that can appear in the virtual world at the center of the circle of assets. After the grouping areas have appeared, the process 1000 proceeds to decision state 1022 wherein the user decides how to group the asset with which the user is engaged in the process 1000 proceeds to block 1024 wherein the asset is moved into one of the groups. After the asset is moved to one of the two groups, the process 1000 can then return to block 1008 wherein the user can engage a new asset in the process can then proceed as outlined above.

After the user has grouped the assets, the process 1000 can proceed to block 1026 wherein it is determined whether a minimum number of groups such as, for example, two groups has been achieved. If the minimum is not achieved, and the user can be prompted to regroup one or several assets. If the minimum is achieved, then the process 1000 proceeds to block 1028 wherein a prompt for the user to indicate completion of the grouping appears in the process 1000 and proceeds to decision state 1030 wherein a user decision as to whether grouping is completed is received. If grouping is not completed, then the process 1000 returns to block 1008 and continues as outlined above. If the grouping is completed, then the process 1000 proceeds to block 1032 wherein the user is prompted to provide an explanation and/or reasoning for the grouping. This explanation and/or reasoning can be recorded by the user device 106 and can be analyzed and used in the generation of a grouping evaluation. After the user's reasoning has been explained, the process proceeds to block 1034 wherein an indicator of completion of the exercises received from the user and the process 1000 and proceeds to block 1036 wherein the experience ends and in some embodiments, the virtual world of the experience washes white.

Figure 15:
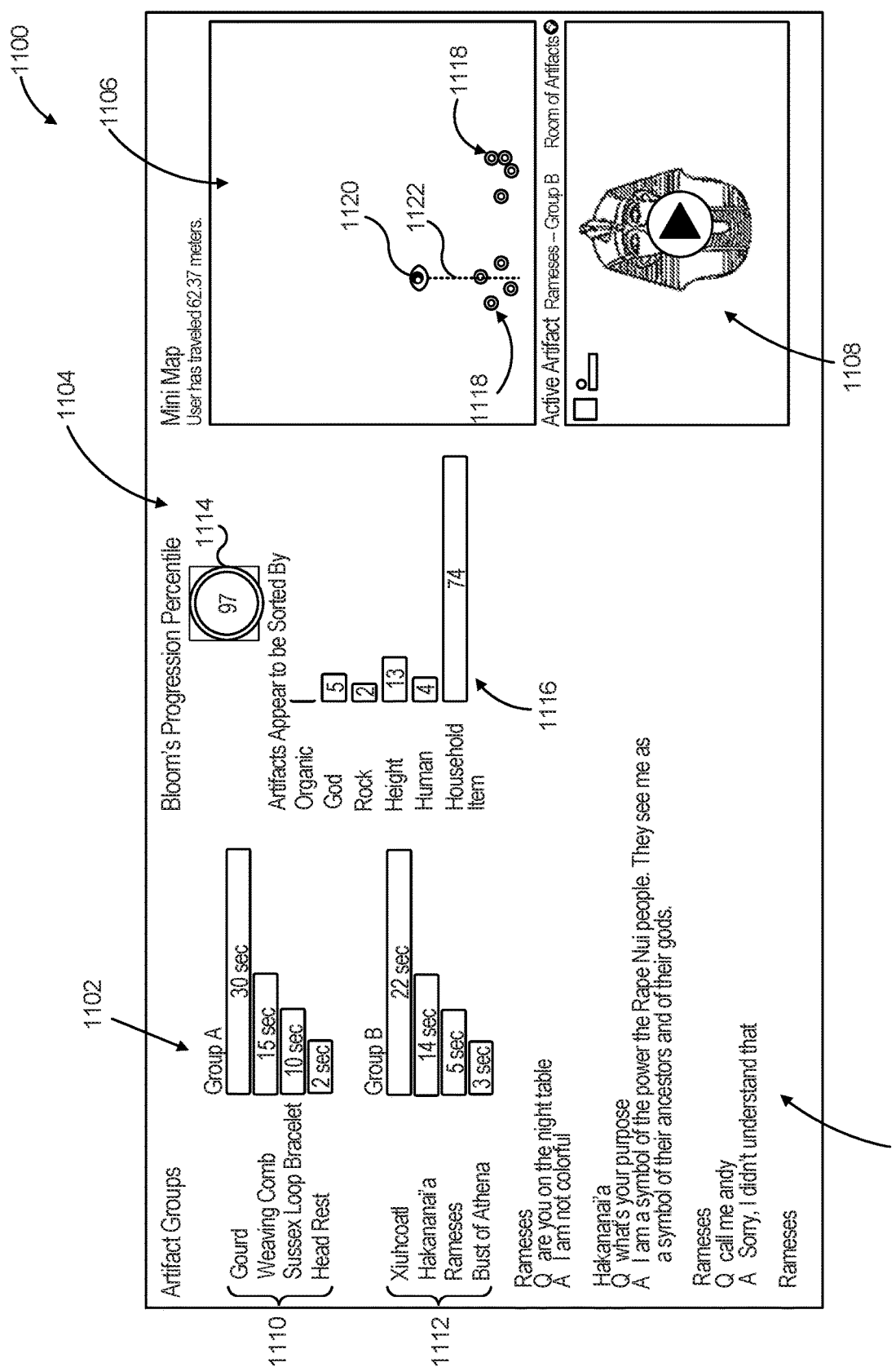
FIG. 15 is depiction of one embodiment of a dashboard.

With reference now to FIG. 15, a depiction of one embodiment of the dashboard 1100 is shown. The dashboard can be generated and/or updated in real-time based on actions of the user within the virtual world and/or the interactions of the user with the one or several assets in the virtual world. The dashboard 1100 can include a plurality of panels that can display information pertaining to the user's interaction with the virtual world and/or one or several assets in the virtual world these can include, for example, a grouping panel 1102, an evaluation panel 1104, and arrangement panel 1106, and an asset panel 1108. The grouping panel 1102 can include information identifying objects within each of one or several groupings. Specifically as shown in FIG. 15, the grouping panel 1102 depicts objects in a first grouping 1110 and the second grouping 1112. The grouping panel further includes information relating to the amount of time spent interacting with each of the assets in each of the groups.

The evaluation panel includes information relating to the evaluation of one or several groups created by the user and specifically relating to the reasons or predicted reasons for the formation of these one or several groups. This can include a score 1114 they can provide an overall evaluation of the grouping and/or the predicted reasons for grouping and this can further include a grouping window reason 1116 which can identify one or several potential grouping reasons and the likelihood of each of those one or several potential grouping reason being the actual grouping reason.

The arrangement panel 1106 can provide information relating to the arrangement of assets 1118 within the virtual world, can provide an icon 1120 indicating the position of the user within the virtual world, and the gaze indicator 1122 indicating the direction of the gaze of the user. In some embodiments, the arrangement panel 1106 can be updated in real time as the user moves through the virtual world, moves assets 1118 within the virtual world, or changes the direction of his gaze.

The asset panel 1108 provides video of the asset with which the user is presently or most recently engaged. This video can be from the perspective of the user and can reflect what the user sees and/or saw in his engagement with the asset. This video can include sound and specifically the verbal interactions between the user and the asset. The dashboard 1100 further includes a text panel 1124. The text panel can display, in text, the verbal interactions between the user and the asset. This text can be broken down into questions and answers and can include an identifier of the source of each part of the text.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged, and/or operations or embodiments may be wholly or partially combined. Further, unless otherwise identified, none of the steps or components shown herein are essential and may be removed form an embodiment as desired. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for virtual reality-based grouping evaluation, the system comprising:
    memory comprising:
        an interaction sub-database comprising information relating to one or several user interactions with at least one virtual asset in a virtual environment;
        a content library database comprising a plurality of virtual assets and information relating to the plurality of virtual assets; and
    at least one server configured to:
        determine user engagement with at least one of the plurality of virtual assets;
        receive data indicative of a grouping interaction with at least one of the plurality of virtual assets, wherein the data indicative of the grouping interaction includes a user input grouping some of the plurality of virtual assets into a group of virtual assets;
        perform a grouping process when a grouping interaction is identified, the grouping process including:
            identifying the group of virtual assets,
            inputting the group of virtual assets into a grouping prediction model,
            identifying a predicted grouping basis, and
            identifying the predicted grouping basis as a grouping reason;
        evaluate the grouping of the plurality of virtual assets based on the grouping reason, including:
            inputting the grouping reason into an evaluation model, and
            outputting a score indicative of a cognitive level of the grouping reason;
        determine interaction quality;
        receive the score indicative of the cognitive level of the grouping reason;
        direct generation of a dashboard in a user device, wherein the dashboard comprises a user interface including panels configured to display information relating to user actions in the virtual environment, wherein at least one of the panels comprises a grouping panel;
        generate an evaluation of the grouping interaction with the at least one of the plurality of virtual assets; and
        deliver the generated evaluation by generating and sending signals containing information for display in the grouping panel, wherein the information for display in the grouping panel identifies one or several virtual assets included in the grouping, wherein the panels comprise an evaluation panel, wherein the evaluation panel is configured to display the score indicative of a cognitive level of the grouping reason for the grouped virtual assets.

2. The system of claim 1, wherein the user input comprises moving the some of the plurality of virtual assets to a location within the virtual environment.

3. The system of claim 2, wherein the location within the virtual environment comprises a virtual table.

4. A method for virtual reality-based grouping evaluation, the method comprising:
    launching a user experience in a virtual environment created by a computing device;
    generating a plurality of assets within the virtual environment;
    determining with the computing device user engagement with at least one of the plurality of virtual assets;
    receiving data at the computing device, wherein the data is indicative of a grouping interaction with at least one of the plurality of virtual assets, wherein the data indicative of the grouping interaction identifies a group of virtual assets, wherein the data indicative of the grouping interaction comprises a user input grouping some of the plurality of virtual assets and the user input comprises moving the some of the plurality of virtual assets to a location within the virtual environment;

performing with the computing device a grouping process based on the received data indicative of the grouping interaction with the at least one of the plurality of virtual assets including:
  identifying the group of virtual assets;
  inputting the group of virtual assets into a grouping prediction model;
  identifying a predicted grouping basis;
  identifying the predicted grouping basis as a grouping reason; and
  evaluating the grouping based on the grouping reason;
generating with the computing device an evaluation of the grouping interaction with the at least one of the plurality of virtual assets including:
  inputting the grouping reason into an evaluation model; and
  outputting a score indicative of a cognitive level of the grouping reason;
determining interaction quality;
receiving the score indicative of the cognitive level of the grouping reason;
directing generation of a dashboard in the user device, wherein the dashboard comprises a user interface including panels configured to display information relating to user actions in the virtual environment, wherein at least one of the panels comprises a grouping panel; and
delivering the generated evaluation to a user device by generating and sending signals containing information for display in the grouping panel, wherein the information for display in the grouping panel identifies one or several virtual assets included in a grouping, wherein at least one of the panels comprises an evaluation panel, and wherein the evaluation panel is configured to display the score indicative of a cognitive level of the grouping reason for the grouped virtual assets.

5. The method of claim 4, wherein the location within the virtual environment comprises a virtual table.

6. The method of claim 4, wherein the interaction quality is determined based at least partially on omitted interactions.

* * * * *